(12) United States Patent
Tsai et al.

(10) Patent No.: US 8,654,458 B2
(45) Date of Patent: *Feb. 18, 2014

(54) WIDE-ANGLE IMAGING LENS ASSEMBLY

(75) Inventors: Tsung Han Tsai, Taichung (TW); Hsiang Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 552 days.

This patent is subject to a terminal disclaimer.

(21) Appl. No.: 12/978,996

(22) Filed: Dec. 27, 2010

(65) Prior Publication Data

US 2012/0069140 A1 Mar. 22, 2012

(30) Foreign Application Priority Data

Sep. 20, 2010 (TW) .............................. 99131795 A

(51) Int. Cl.
*G02B 9/60* (2006.01)
*G02B 9/34* (2006.01)
*G02B 13/04* (2006.01)

(52) U.S. Cl.
CPC *G02B 13/04* (2013.01); *G02B 9/60* (2013.01); *G02B 9/34* (2013.01)
USPC .............................. 359/770; 359/753; 359/781

(58) Field of Classification Search
USPC .................... 359/753, 762, 770, 781
See application file for complete search history.

(56) References Cited

U.S. PATENT DOCUMENTS

| 7,164,538 | B1 * | 1/2007 | Noda | 359/680 |
| 7,446,955 | B1 | 11/2008 | Noda | |
| 8,174,777 | B2 * | 5/2012 | Tang et al. | 359/784 |
| 2010/0295985 | A1 * | 11/2010 | Matsusaka | 348/345 |

FOREIGN PATENT DOCUMENTS

JP  2004-317866 A  11/2004

OTHER PUBLICATIONS

Machine translation of JP 2004-317866 A obtained Jun. 24, 2013.*

* cited by examiner

*Primary Examiner* — ALlicia M Harrington
*Assistant Examiner* — Cara Rakowski
(74) *Attorney, Agent, or Firm* — Morris Manning & Martin LLP; Tim Tingkang Xia, Esq.

(57) ABSTRACT

The present invention provides a wide-angle imaging lens assembly comprising, in order from an object side to an image side: a first lens element with negative refractive power having a convex object-side surface and a concave image-side surface; a second lens element with negative refractive power having a convex object-side surface and a concave image-side surface; a third lens element with positive refractive power; a fourth lens element with negative refractive power having a concave image-side surface; and a fifth lens element with positive refractive power; wherein the two lens elements with refractive power closest to the object side are the first lens element and the second lens element; and wherein the number of lens elements with refractive power does not exceed six.

19 Claims, 36 Drawing Sheets

| TABLE 1 | | | | | | | |
|---|---|---|---|---|---|---|---|
| (Embodiment 1) | | | | | | | |
| f = 2.78 mm, Fno = 2.80, HFOV = 78.0 deg. | | | | | | | |
| Surface # | | Curvature Radius | Thickness | Material | Index | Abbe # | Focal length |
| 0 | Object | Plano | Infinity | | | | |
| 1 | Lens 1 | 61.349700 | 0.800 | Glass | 1.729 | 54.7 | -4.54 |
| 2 | | 3.125000 | 3.500 | | | | |
| 3 | Lens 2 | 2.358340 (ASP) | 1.307 | Plastic | 1.650 | 21.4 | -17.39 |
| 4 | | 1.525250 (ASP) | 1.190 | | | | |
| 5 | Lens 3 | 1.698790 (ASP) | 1.362 | Plastic | 1.544 | 55.9 | 2.90 |
| 6 | | -16.000000 (ASP) | 0.070 | | | | |
| 7 | Ape. Stop | Plano | 1.703 | | | | |
| 8 | Lens 4 | -11.990700 | 0.350 | Glass | 1.805 | 25.4 | -3.08 |
| 9 | | 3.168400 | 0.010 | Cement | | | |
| 10 | Lens 5 | 3.168400 | 1.895 | Glass | 1.743 | 49.3 | 2.85 |
| 11 | | -4.757200 | 1.000 | | | | |
| 12 | IR-filter | Plano | 0.300 | Glass | 1.517 | 64.2 | - |
| 13 | | Plano | 1.511 | | | | |
| 14 | Image | Plano | - | | | | |
| Note : Reference wavelength is d-line 587.6nm | | | | | | | |

Fig.10

| TABLE 2 | | | | |
|---|---|---|---|---|
| Aspheric Coefficients | | | | |
| Surface # | 3 | 4 | 5 | 6 |
| k = | -7.68361E-01 | -1.67079E+00 | 2.16182E-01 | -1.00000E+00 |
| A4 = | -9.30183E-03 | 1.60393E-03 | -6.53789E-03 | 5.26641E-02 |
| A6 = | -2.58613E-03 | -1.33700E-02 | 2.20778E-03 | 2.87669E-02 |
| A8 = | -4.82259E-05 | 1.01188E-03 | -1.74840E-03 | -1.75931E-02 |
| A10= | -1.17371E-05 | 9.42760E-05 | 5.73103E-04 | 2.41438E-02 |

Fig.11

| TABLE 3 | | | | | | |
|---|---|---|---|---|---|---|
| (Embodiment 2) | | | | | | |
| f = 1.19 mm, Fno = 2.20, HFOV = 84.1 deg. | | | | | | |
| Surface # | | Curvature Radius | Thickness | Material | Index | Abbe # | Focal length |
| 0 | Object | Plano | Infinity | | | | |
| 1 | Lens 1 | 9.378300 | 0.800 | Glass | 1.729 | 54.7 | -5.62 |
| 2 | | 2.749100 | 2.740 | | | | |
| 3 | Lens 2 | 7.462700 (ASP) | 1.700 | Plastic | 1.632 | 23.4 | -6.00 |
| 4 | | 2.292880 (ASP) | 0.687 | | | | |
| 5 | Ape. Stop | Plano | 0.204 | | | | |
| 6 | Lens 3 | 2.173770 (ASP) | 1.551 | Plastic | 1.514 | 56.8 | 1.03 |
| 7 | | -0.527000 (ASP) | 0.100 | | | | |
| 8 | Lens 4 | -1.295640 (ASP) | 0.350 | Plastic | 1.632 | 23.4 | -0.83 |
| 9 | | 0.971220 (ASP) | 0.441 | | | | |
| 10 | Lens 5 | 14.240800 (ASP) | 1.744 | Plastic | 1.514 | 56.8 | 1.84 |
| 11 | | -0.971880 (ASP) | 0.400 | | | | |
| 12 | IR-filter | Plano | 0.300 | Glass | 1.517 | 64.2 | - |
| 13 | | Plano | 0.400 | | | | |
| 14 | Cover-glass | Plano | 0.550 | Glass | 1.517 | 64.2 | - |
| 15 | | Plano | 0.330 | | | | |
| 16 | Image | Plano | - | | | | |
| Note : Reference wavelength is d-line 587.6nm | | | | | | | |

Fig.12

| TABLE 4 | | | | |
|---|---|---|---|---|
| Aspheric Coefficients | | | | |
| Surface # | 3 | 4 | 6 | 7 |
| k = | -1.00000E+00 | -1.00000E+00 | -1.50548E+01 | -3.18145E+00 |
| A4 = | 2.15032E-02 | 4.06006E-03 | 9.16246E-02 | 1.26996E-01 |
| A6 = | -1.41389E-02 | -7.89915E-02 | -1.66451E-01 | -4.40461E-01 |
| A8 = | 2.37398E-03 | 2.83370E-02 | 1.13006E-01 | 3.14951E-01 |
| A10= | -1.50971E-04 | 1.15143E-02 | -8.19772E-02 | -9.70404E-02 |
| Surface # | 8 | 9 | 10 | 11 |
| k = | -1.84609E+01 | -1.17864E+01 | -1.23876E+01 | -9.23276E-01 |
| A4 = | -4.55397E-02 | -4.68630E-02 | 1.17316E-02 | 1.05937E-01 |
| A6 = | -1.03519E-01 | 2.33331E-02 | 5.20462E-03 | -2.76028E-02 |
| A8 = | -2.73802E-02 | -1.27404E-02 | -2.83293E-03 | 7.61998E-03 |
| A10= | 4.08809E-02 | 2.83079E-03 | 4.13162E-04 | -5.94489E-04 |

Fig.13

| TABLE 5 | | | | | | |
|---|---|---|---|---|---|---|
| (Embodiment 3) | | | | | | |
| f = 2.68 mm, Fno = 2.80, HFOV = 75.5 deg. | | | | | | |
| Surface # | | Curvature Radius | Thickness | Material | Index | Abbe # | Focal length |
| 0 | Object | Plano | Infinity | | | | |
| 1 | Lens 1 | 28.836200 | 0.800 | Glass | 1.620 | 60.3 | -5.72 |
| 2 | | 3.125000 | 2.662 | | | | |
| 3 | Lens 2 | 1.861930 (ASP) | 1.143 | Plastic | 1.634 | 23.8 | -44.97 |
| 4 | | 1.331490 (ASP) | 1.174 | | | | |
| 5 | Lens 3 | -12.779300 (ASP) | 1.597 | Plastic | 1.544 | 55.9 | 4.47 |
| 6 | | -2.134760 (ASP) | 0.070 | | | | |
| 7 | Ape. Stop | Plano | 1.318 | | | | |
| 8 | Lens 4 | 15.082400 | 0.350 | Glass | 1.847 | 23.8 | -4.80 |
| 9 | | 3.168400 | 0.010 | Cement | | | |
| 10 | Lens 5 | 3.168400 | 1.968 | Glass | 1.729 | 54.7 | 3.04 |
| 11 | | -5.459300 | 1.000 | | | | |
| 12 | IR-filter | Plano | 0.300 | Glass | 1.517 | 64.2 | - |
| 13 | | Plano | 2.607 | | | | |
| 14 | Image | Plano | - | | | | |
| Note : Reference wavelength is d-line 587.6nm | | | | | | |

Fig.14

| TABLE 6 | | | | |
|---|---|---|---|---|
| Aspheric Coefficients | | | | |
| Surface # | 3 | 4 | 5 | 6 |
| k = | -6.65433E-01 | -8.28977E-01 | 9.42693E+01 | 7.85277E-01 |
| A4 = | 5.99846E-03 | 3.05567E-02 | -1.71471E-02 | 5.93992E-03 |
| A6 = | 3.22263E-03 | 3.50543E-02 | -8.44249E-03 | 2.79810E-03 |
| A8 = | -8.24814E-04 | -2.38029E-02 | 6.28490E-03 | -2.16143E-03 |
| A10= | 1.73038E-04 | 1.19166E-02 | -4.28271E-03 | 1.76441E-03 |

Fig.15

| TABLE 7 | | | | | | | |
|---|---|---|---|---|---|---|---|
| (Embodiment 4) | | | | | | | |
| f = 2.49 mm, Fno = 2.80, HFOV= 73.2 deg. | | | | | | | |
| Surface # | | Curvature Radius | Thickness | Material | Index | Abbe # | Focal length |
| 0 | Object | Plano | Infinity | | | | |
| 1 | Lens 1 | -7.332700 (ASP) | 0.800 | Plastic | 1.544 | 55.9 | -3.92 |
| 2 | | 3.125000 (ASP) | 3.254 | | | | |
| 3 | Lens 2 | 1.809440 (ASP) | 1.017 | Plastic | 1.632 | 23.4 | -24.78 |
| 4 | | 1.269000 (ASP) | 0.971 | | | | |
| 5 | Lens 3 | 1.788100 (ASP) | 1.392 | Plastic | 1.544 | 55.9 | 2.89 |
| 6 | | -9.410800 (ASP) | 0.070 | | | | |
| 7 | Ape. Stop | Plano | 1.506 | | | | |
| 8 | Lens 4 | -25.000000 | 0.350 | Glass | 1.847 | 23.8 | -3.30 |
| 9 | | 3.168400 | 0.010 | Cement | | | |
| 10 | Lens 5 | 3.168400 | 1.933 | Glass | 1.729 | 54.7 | 2.78 |
| 11 | | -4.166900 | 1.000 | | | | |
| 12 | IR-filter | Plano | 0.300 | Glass | 1.517 | 64.2 | - |
| 13 | | Plano | 1.402 | | | | |
| 14 | Image | Plano | - | | | | |
| Note : Reference wavelength is d-line 587.6nm | | | | | | | |

Fig.16

| TABLE 8 | | | | |
|---|---|---|---|---|
| Aspheric Coefficients | | | | |
| Surface # | 1 | 2 | 3 | 4 |
| k = | -4.01456E+01 | 6.57926E-01 | -1.06902E+00 | -1.57584E+00 |
| A4 = | 1.29744E-03 | 3.76114E-03 | -1.49939E-02 | -4.20889E-03 |
| A6 = | -1.82927E-05 | -9.73854E-04 | -2.81411E-03 | -1.30040E-02 |
| A8 = | -1.34142E-07 | 9.64527E-05 | 1.05085E-04 | 3.49136E-03 |
| A10= | 6.00724E-09 | 6.31730E-06 | 1.26023E-04 | -4.91232E-05 |
| Surface # | 5 | 6 | | |
| k = | 3.94699E-01 | -1.00000E+00 | | |
| A4 = | -9.51701E-03 | 4.58157E-02 | | |
| A6 = | 3.33652E-04 | 2.20684E-02 | | |
| A8 = | -9.81509E-04 | -1.79062E-02 | | |
| A10= | 6.06974E-04 | 2.77312E-02 | | |

Fig.17

| TABLE 9 | | | | | | |
|---|---|---|---|---|---|---|
| (Embodiment 5) | | | | | | |
| f = 1.23 mm, Fno = 2.20, HFOV= 84.0 deg. | | | | | | |
| Surface # | | Curvature Radius | Thickness | Material | Index | Abbe # | Focal length |
| 0 | Object | Plano | Infinity | | | | |
| 1 | Lens 1 | 9.378300 | 0.800 | Glass | 1.729 | 54.7 | -5.62 |
| 2 | | 2.749100 | 2.740 | | | | |
| 3 | Lens 2 | 7.462700 (ASP) | 1.700 | Plastic | 1.632 | 23.4 | -6.18 |
| 4 | | 2.338630 (ASP) | 0.698 | | | | |
| 5 | Ape. Stop | Plano | 0.110 | | | | |
| 6 | Lens 3 | 2.561640 (ASP) | 1.586 | Plastic | 1.514 | 56.8 | 1.07 |
| 7 | | -0.554300 (ASP) | 0.100 | | | | |
| 8 | Lens 4 | -2.392830 (ASP) | 0.350 | Plastic | 1.632 | 23.4 | -0.99 |
| 9 | | 0.889140 (ASP) | 0.441 | | | | |
| 10 | Lens 5 | -5.467600 (ASP) | 1.512 | Plastic | 1.514 | 56.8 | 1.98 |
| 11 | | -0.937110 (ASP) | 0.400 | | | | |
| 12 | IR-filter | Plano | 0.300 | Glass | 1.517 | 64.2 | - |
| 13 | | Plano | 0.400 | | | | |
| 14 | Cover-glass | Plano | 0.550 | Glass | 1.517 | 64.2 | - |
| 15 | | Plano | 0.335 | | | | |
| 16 | Image | Plano | - | | | | |
| Note : Reference wavelength is d-line 587.6nm | | | | | | |

Fig.18

| TABLE 10 | | | | |
|---|---|---|---|---|
| Aspheric Coefficients | | | | |
| Surface # | 3 | 4 | 6 | 7 |
| k = | -1.00000E+00 | -1.00000E+00 | -2.18855E+01 | -2.99351E+00 |
| A4 = | 1.96620E-02 | -1.04916E-02 | 4.01852E-02 | 5.86584E-02 |
| A6 = | -1.49631E-02 | -7.95092E-02 | -1.71477E-01 | -3.84372E-01 |
| A8 = | 2.89728E-03 | 4.94168E-02 | 5.79759E-03 | 3.01808E-01 |
| A10= | -2.17360E-04 | -5.91980E-03 | -6.18214E-02 | -1.11949E-01 |
| Surface # | 8 | 9 | 10 | 11 |
| k = | -5.06190E+01 | -9.69819E+00 | 8.90503E+00 | -9.13186E-01 |
| A4 = | -4.99342E-02 | -3.43643E-02 | 9.25374E-02 | 1.08810E-01 |
| A6 = | -1.10175E-01 | 1.79217E-02 | -2.12807E-05 | -2.84047E-02 |
| A8 = | 1.10155E-03 | -1.48471E-02 | -1.14647E-02 | 1.10165E-02 |
| A10= | 3.09139E-02 | 4.06806E-03 | 2.90352E-03 | -1.15642E-03 |

Fig.19

| TABLE 11 | | | | | | | |
|---|---|---|---|---|---|---|---|
| (Embodiment 6) | | | | | | | |
| f = 3.06 mm, Fno = 2.80, HFOV= 77.8 deg. | | | | | | | |
| Surface # | | Curvature Radius | Thickness | Material | Index | Abbe # | Focal length |
| 0 | Object | Plano | Infinity | | | | |
| 1 | Lens 1 | 81.300800 (ASP) | 1.000 | Plastic | 1.544 | 55.9 | -6.00 |
| 2 | | 3.125000 (ASP) | 2.589 | | | | |
| 3 | Lens 2 | 1.815820 (ASP) | 1.205 | Plastic | 1.608 | 25.7 | -24.46 |
| 4 | | 1.212210 (ASP) | 1.330 | | | | |
| 5 | Lens 3 | 1.800220 (ASP) | 1.249 | Plastic | 1.544 | 55.9 | 3.14 |
| 6 | | -25.865300 (ASP) | 0.070 | | | | |
| 7 | Ape. Stop | Plano | 1.138 | | | | |
| 8 | Lens 4 | -17.270500 | 0.600 | Glass | 1.805 | 25.4 | -3.28 |
| 9 | | 3.168400 | 0.010 | Cement | | | |
| 10 | Lens 5 | 3.168400 | 1.788 | Glass | 1.743 | 49.3 | 2.63 |
| 11 | | -3.876200 | 1.000 | | | | |
| 12 | IR-filter | Plano | 0.300 | Glass | 1.517 | 64.2 | - |
| 13 | | Plano | 1.720 | | | | |
| 14 | Image | Plano | - | | | | |
| Note : Reference wavelength is d-line 587.6nm | | | | | | | |

Fig.20

| TABLE 12 | | | | |
|---|---|---|---|---|
| Aspheric Coefficients | | | | |
| Surface # | 1 | 2 | 3 | 4 |
| k  = | -1.00000E+00 | 4.63859E-01 | -6.89920E-01 | -1.54363E+00 |
| A4 = | -1.96787E-04 | -2.70500E-03 | -1.05526E-02 | 2.29917E-02 |
| A6 = | 1.23634E-05 | -2.50617E-04 | -1.98219E-03 | -1.71357E-02 |
| A8 = | -2.10006E-08 | 8.10590E-05 | -3.17082E-04 | 6.62918E-04 |
| A10= | -2.70679E-09 | -8.88638E-06 | 6.17313E-05 | 2.71110E-04 |
| Surface # | 5 | 6 | | |
| k  = | 4.57594E-01 | -1.00000E+00 | | |
| A4 = | -1.22604E-03 | 5.59458E-02 | | |
| A6 = | -2.65133E-04 | 1.43612E-02 | | |
| A8 = | 9.56794E-04 | 8.17357E-03 | | |
| A10= | -6.51768E-04 | 9.63179E-03 | | |

Fig.21

| TABLE 13 | | | | | | | |
|---|---|---|---|---|---|---|---|
| (Embodiment 7) | | | | | | | |
| f = 2.75 mm, Fno = 2.40, HFOV = 84.0 deg. | | | | | | | |
| Surface # | | Curvature Radius | Thickness | Material | Index | Abbe # | Focal length |
| 0 | Object | Plano | Infinity | | | | |
| 1 | Lens 1 | 21.411800 | 0.964 | Glass | 1.516 | 64.1 | -7.84 |
| 2 | | 3.352400 | 3.182 | | | | |
| 3 | Lens 2 | -19.868500 (ASP) | 1.500 | Plastic | 1.608 | 25.7 | -6.92 |
| 4 | | 5.986600 (ASP) | 2.577 | | | | |
| 5 | Lens 3 | 3.771300 (ASP) | 1.913 | Plastic | 1.544 | 55.9 | 3.48 |
| 6 | | -3.116000 (ASP) | 0.070 | | | | |
| 7 | Ape. Stop | Plano | 2.487 | | | | |
| 8 | Lens 4 | -8.971900 | 0.350 | Glass | 1.805 | 25.4 | -2.73 |
| 9 | | 3.168400 | 0.010 | Cement | | | |
| 10 | Lens 5 | 3.168400 | 2.179 | Glass | 1.743 | 49.3 | 3.25 |
| 11 | | -4.076200 | 1.000 | | | | |
| 12 | IR-filter | Plano | 0.300 | Glass | 1.517 | 64.2 | - |
| 13 | | Plano | 1.469 | | | | |
| 14 | Image | Plano | - | | | | |
| Note : Reference wavelength is d-line 587.6nm | | | | | | | |

Fig.22

| TABLE 14 | | | | |
|---|---|---|---|---|
| Aspheric Coefficients | | | | |
| Surface # | 3 | 4 | 5 | 6 |
| k = | -1.00000E+00 | -1.33581E+01 | 7.98660E-01 | -1.00000E+00 |
| A4 = | -1.60168E-02 | -1.00310E-02 | -9.59491E-03 | 3.80120E-03 |
| A6 = | 1.23146E-03 | 4.31402E-03 | -2.10624E-04 | -7.16608E-04 |
| A8 = | 1.12209E-04 | -8.01564E-04 | 9.77481E-05 | 1.61165E-04 |
| A10= | -1.31333E-05 | 1.80603E-04 | -9.01424E-06 | -7.47216E-06 |

Fig.23

| TABLE 15 ||||||||
|---|---|---|---|---|---|---|---|
| (Embodiment 8) ||||||||
| f = 1.27 mm, Fno = 2.82, HFOV = 72.4 deg. ||||||||
| Surface # | | Curvature Radius | Thickness | Material | Index | Abbe # | Focal length |
| 0 | Object | Plano | Infinity | | | | |
| 1 | Lens 1 | 9.640274 | 0.833 | Glass | 1.589 | 61.3 | -8.88 |
| 2 | | 3.282339 | 2.750 | | | | |
| 3 | Lens 2 | 4.065613 (ASP) | 0.648 | Plastic | 1.514 | 56.8 | -2.94 |
| 4 | | 1.041521 (ASP) | 2.534 | | | | |
| 5 | Lens 6 | 4.022976 | 2.319 | Glass | 1.805 | 25.5 | 7.18 |
| 6 | | 9.815405 | 1.598 | | | | |
| 7 | Ape. Stop | Plano | 0.300 | | | | |
| 8 | Lens 3 | 2.711143 | 1.684 | Glass | 1.497 | 81.6 | 3.04 |
| 9 | | -2.711143 | 0.258 | | | | |
| 10 | Lens 4 | -2.089520 (ASP) | 0.550 | Plastic | 1.608 | 25.7 | -2.68 |
| 11 | | 8.183415 (ASP) | 0.187 | | | | |
| 12 | Lens 5 | 3.241733 (ASP) | 2.131 | Plastic | 1.514 | 56.8 | 3.06 |
| 13 | | -2.367229 (ASP) | 1.000 | | | | |
| 14 | IR-filter | Plano | 0.300 | Glass | 1.517 | 64.2 | - |
| 15 | | Plano | 0.500 | | | | |
| 16 | Cover-glass | Plano | 0.500 | Glass | 1.517 | 64.2 | - |
| 17 | | Plano | 0.731 | | | | |
| 18 | Image | Plano | - | | | | |
| Note : Reference wavelength is d-line 587.6nm ||||||||

Fig.24

| TABLE 16 | | | | |
|---|---|---|---|---|
| Aspheric Coefficients | | | | |
| Surface # | 3 | 4 | 10 | 11 |
| k = | 0.00000E+00 | -8.80033E-01 | 0.00000E+00 | 0.00000E+00 |
| A4 = | -1.72398E-02 | -4.00151E-02 | -3.49476E-02 | -3.59021E-02 |
| A6 = | 8.60812E-04 | -1.46460E-03 | 2.49829E-02 | 1.79699E-02 |
| A8 = | -2.32329E-05 | 1.89733E-04 | -6.67513E-03 | -3.98152E-03 |
| A10= | 1.81977E-07 | 8.78157E-05 | 8.52229E-04 | 4.29390E-04 |
| A12= | -3.65269E-08 | -1.36236E-05 | | |
| Surface # | 12 | 13 | | |
| k = | -1.41292E+00 | -2.27025E+00 | | |
| A4 = | -9.28158E-03 | 1.35469E-02 | | |
| A6 = | 2.31450E-04 | -1.99109E-03 | | |
| A8 = | 6.36181E-04 | -1.57283E-04 | | |
| A10= | -1.71363E-04 | 9.15312E-05 | | |
| A12= | 1.26101E-05 | -9.91420E-06 | | |

Fig.25

| TABLE 17 | | | | | | | |
|---|---|---|---|---|---|---|---|
| (Embodiment 9) | | | | | | | |
| f = 1.70 mm, Fno = 2.40, HFOV = 88.7 deg. | | | | | | | |
| Surface # | | Curvature Radius | Thickness | Material | Index | Abbe # | Focal length |
| 0 | Object | Plano | Infinity | | | | |
| 1 | Lens 1 | 20.381700 | 1.000 | Glass | 1.729 | 54.7 | -6.07 |
| 2 | | 3.559000 | 1.373 | | | | |
| 3 | Lens 2 | 5.949500 | 0.900 | Glass | 1.729 | 54.7 | -6.64 |
| 4 | | 2.500000 | 3.580 | | | | |
| 5 | Lens 6 | 12.846700 | 4.500 | Glass | 1.785 | 25.7 | 5.50 |
| 6 | | -5.504200 | 0.100 | | | | |
| 7 | Ape. Stop | Plano | 0.100 | | | | |
| 8 | Lens 3 | 5.591300 | 1.860 | Glass | 1.697 | 55.5 | 3.09 |
| 9 | | -3.017800 | 0.010 | | | | |
| 10 | Lens 4 | -3.015300 | 0.550 | Glass | 1.847 | 23.8 | -2.05 |
| 11 | | 4.415300 | 0.187 | | | | |
| 12 | Lens 5 | 6.276000 | 1.590 | Glass | 1.804 | 46.6 | 4.14 |
| 13 | | -6.276000 | 1.000 | | | | |
| 14 | IR-filter | Plano | 0.750 | Glass | 1.517 | 64.2 | - |
| 15 | | Plano | 1.711 | | | | |
| 16 | Image | Plano | - | | | | |
| Note : Reference wavelength is d-line 587.6nm | | | | | | | |

Fig.26

TABLE 18

| | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| f | 2.78 | 1.19 | 2.68 | 2.49 | 1.23 | 3.06 | 2.75 | 1.27 | 1.70 |
| Fno | 2.80 | 2.20 | 2.80 | 2.80 | 2.20 | 2.80 | 2.40 | 2.82 | 2.40 |
| HFOV | 78.0 | 84.1 | 75.5 | 73.2 | 84.0 | 77.8 | 84.0 | 72.4 | 88.7 |
| V1-V2 | 33.3 | 31.3 | 36.5 | 32.5 | 31.3 | 30.2 | 42.7 | 4.5 | 0.0 |
| f1/f2 | 0.26 | 0.94 | 0.13 | 0.16 | 0.91 | 0.25 | 1.13 | 3.02 | 0.91 |
| R8/R7 | -0.26 | -0.75 | 0.21 | -0.13 | -0.37 | -0.18 | -0.35 | -3.92 | -1.46 |
| (R1+R2)/(R1-R2) | 1.11 | 1.83 | 1.24 | 0.40 | 1.83 | 1.08 | 1.37 | 2.03 | 1.42 |
| f23/f12 | 0.34 | 0.33 | 0.44 | 0.30 | 0.29 | 0.51 | 0.81 | 2.45 | 6.03 |
| CT4/R8 | 0.11 | 0.36 | 0.11 | 0.11 | 0.39 | 0.19 | 0.11 | 0.07 | 0.12 |
| f/ImgH | 0.93 | 0.46 | 0.96 | 0.83 | 0.47 | 1.02 | 0.89 | 0.56 | 0.75 |
| SL/TTL | 0.45 | 0.51 | 0.50 | 0.46 | 0.49 | 0.46 | 0.43 | 0.42 | 0.40 |
| TTL/ImgH | 4.97 | 4.63 | 5.32 | 4.63 | 4.53 | 4.63 | 5.77 | 8.14 | 8.31 |

WIDE-ANGLE IMAGING LENS ASSEMBLY

CROSS-REFERENCE TO RELATED PATENT APPLICATION

This non-provisional application claims priority under 35 U.S.C. §119(a) on Taiwanese Patent Application No(s). 099131795 filed in Taiwan, R.O.C., on Sep. 20, 2010, the entire contents of which are hereby incorporated by reference.

BACKGROUND OF THE INVENTION

1. Field of the Invention

The present invention relates to a wide-angle imaging lens assembly, and more particularly, to a compact wide-angle imaging lens assembly.

2. Description of the Prior Art

In recent years, optical imaging lenses have been applied to a wide variety of apparatuses such as mobile phone cameras, webcams, automotive lens assemblies, security surveillance cameras and electronic game devices, and the sensor of a general imaging lens is none other than CCD (charge coupled device) or CMOS Sensor (Complementary Metal Oxide Semiconductor Sensor). Furthermore, as advances in semiconductor manufacturing technology have allowed the pixel size of sensors to be reduced and imaging lenses have become more compact with high resolution, there is an increasing demand for imaging lenses featuring better image quality.

Imaging lenses used in vehicle cameras, security surveillance cameras or electronic game devices typically require a larger field of view to capture an image of a larger area at one time. Generally, a conventional imaging lens assembly with a large angle of view, such as the four-element lens assembly disclosed in U.S. Pat. No. 7,446,955, is arranged in such manner that the front lens group has negative refractive power and the rear lens group has positive refractive power, thereby forming an inverse telephoto structure to achieve a large field of view. While such arrangement facilitates the enlargement of the field of view, the aberration correction of the optical system is ineffective due to the inclusion of only one lens element in the rear lens group. Moreover, vehicles equipped with rear-view cameras have become more and more common, and there is a trend toward high-resolution, wide-angle lenses for rear-view cameras. Therefore, a need exists in the art for a wide-angle imaging lens assembly, which has a wide field of view, high image quality and a moderate total track length.

SUMMARY OF THE INVENTION

The present invention provides a wide-angle imaging lens assembly comprising, in order from an object side to an image side: a first lens element with negative refractive power having a convex object-side surface and a concave image-side surface; a second lens element with negative refractive power having a convex object-side surface and a concave image-side surface; a third lens element with positive refractive power; a fourth lens element with negative refractive power having a concave image-side surface; and a fifth lens element with positive refractive power; wherein the two lens elements with refractive power closest to the object side are the first lens element and the second lens element; wherein the number of lens elements with refractive power does not exceed six; wherein the wide-angle imaging lens assembly is further provided with an electronic sensor for image formation of an object; and wherein a focal length of the first lens element is $f1$, a focal length of the second lens element is $f2$, a distance on an optical axis between the second lens element and the third lens element is $T23$, a distance on the optical axis between the first lens element and the second lens element is $T12$, a radius of curvature of the image-side surface of the fourth lens element is $R8$, a radius of curvature of the object-side surface of the fourth lens element is $R7$, a focal length of the wide-angle imaging lens assembly is $f$, half of a diagonal length of an effective pixel area of the electronic sensor is ImgH, and they satisfy the relations: $0<f1/f2<2.00$, $0.15<T23/T12<0.69$, $-1.40<R8/R7<0.70$, $0.30<f/ImgH<1.25$.

The present invention provides another wide-angle imaging lens assembly comprising, in order from an object side to an image side: a first lens element with negative refractive power having a concave image-side surface; a second lens element with negative refractive power having a concave image-side surface; a third lens element with positive refractive power; a fourth lens element with negative refractive power; and a fifth lens element with positive refractive power; wherein the wide-angle imaging lens assembly is further provided with a stop and an electronic sensor, the stop is disposed between the second lens element and the fourth lens element, the electronic sensor is disposed at the image plane for image formation of an object; wherein the two lens elements with refractive power closest to the object side are the first lens element and the second lens element; wherein the number of lens elements with refractive power does not exceed six; and wherein a focal length of the first lens element is $f1$, a focal length of the second lens element is $f2$, a distance on an optical axis between the stop and the electronic sensor is $SL$, a distance on the optical axis between an object-side surface of the first lens element and the electronic sensor is $TTL$, half of a diagonal length of an effective pixel area of the electronic sensor is ImgH, and they satisfy the relations: $0<f1/f2<2.00$, $0.20<SL/TTL<0.85$, $TTL/ImgH<8.6$.

The present invention provides yet another wide-angle imaging lens assembly comprising, in order from an object side to an image side: a first lens element with negative refractive power having a concave image-side surface; a second lens element with negative refractive power having a convex object-side surface and a concave image-side surface; a third lens element with positive refractive power; a fourth lens element with negative refractive power having a concave image-side surface; and a fifth lens element with positive refractive power; wherein the number of lens elements with refractive power is five; wherein the wide-angle imaging lens assembly is further provided with an electronic sensor for image formation of an object; and wherein a thickness of the fourth lens element on an optical axis is $CT4$, a radius of curvature of the image-side surface of the fourth lens element is $R8$, a focal length of the wide-angle imaging lens assembly is $f$, half of a diagonal length of an effective pixel area of the electronic sensor is ImgH, and they satisfy the relations: $0<CT4/R8<0.70$, $0.30<f/ImgH<1.25$.

With the aforementioned arrangement of lens elements, a sufficient field of view can be achieved, the sensitivity of the optical system can be attenuated and the image quality can be improved.

In the present wide-angle imaging lens assembly, the first lens element and the second lens element both have negative refractive power and a concave image-side surface so that the field of view of the optical system can be favorably enlarged. Moreover, the balanced distribution of negative refractive power by the two lens elements with negative refractive power can prevent the aberration of the optical system from increasing excessively. The third lens element has positive refractive power so as to provide part of the refractive power for the optical system and to facilitate the correction of the aberration generated by the first lens element and the second lens element. The fourth lens element has negative refractive power so that the chromatic aberration of the optical system can be favorably corrected. The fifth lens element has positive refractive power so as to effectively distribute the refractive power of the third lens element, thereby facilitating the attenuation of the sensitivity of the optical system.

In the present wide-angle imaging lens assembly, when the first lens element has a convex object-side surface and a concave image-side surface and the second lens element has a convex object-side surface and a concave image-side surface, the field of view of the optical system can be favorably enlarged and the refraction of incident light will become more moderate to prevent the aberration from becoming too large. Accordingly, a balance between enlarging the field of view of the optical system and correcting the aberration can be favorably achieved. When the fourth lens element has a concave object-side surface, the chromatic aberration of the optical system can be favorably corrected. Preferably, the object-side and image-side surfaces of the fourth lens element are both concave. When the fifth lens element has a convex object-side surface and a convex image-side surface, the positive refractive power thereof can be favorably enhanced, thereby the refractive power of the third lens element can be favorably distributed to attenuate the sensitivity of the optical system. Preferably, the fourth lens element and the fifth lens element are attached together to form a doublet lens, which allows the chromatic aberration of the optical system to be corrected more effectively. Preferably, the wide-angle imaging lens assembly further comprises a sixth lens element disposed between any two of the second through fifth lens elements, thereby the high order aberrations of the optical system can be corrected more favorably to improve the image quality.

In the present wide-angle imaging lens assembly, the stop may be disposed between the second lens element and the fourth lens element. For a wide-angle optical system, it requires special effort to correct the distortion and chromatic aberration of magnification, and the correction can be made by placing the stop in a location where the refractive power of the optical system is balanced. Therefore, in the present wide-angle imaging lens assembly, the stop is disposed between the second lens element and the fourth lens element. By arranging at least two lens elements in front of the stop, a sufficient field of view can be achieved. Furthermore, the disposition of at least two lens elements behind the stop facilitates the correction of the aberration of the optical system so that the image quality can be improved. Also, such arrangement of the stop can help attenuate the sensitivity of the optical system.

BRIEF DESCRIPTION OF THE DRAWINGS

FIG. 10 is TABLE 1 which lists the optical data of the first embodiment.

FIG. 11 is TABLE 2 which lists the aspheric surface data of the first embodiment.

FIG. 12 is TABLE 3 which lists the optical data of the second embodiment.

FIG. 13 is TABLE 4 which lists the aspheric surface data of the second embodiment.

FIG. 14 is TABLE 5 which lists the optical data of the third embodiment.

FIG. 15 is TABLE 6 which lists the aspheric surface data of the third embodiment.

FIG. 16 is TABLE 7 which lists the optical data of the fourth embodiment.

FIG. 17 is TABLE 8 which lists the aspheric surface data of the fourth embodiment.

FIG. 18 is TABLE 9 which lists the optical data of the fifth embodiment.

FIG. 19 is TABLE 10 which lists the aspheric surface data of the fifth embodiment.

FIG. 20 is TABLE 11 which lists the optical data of the sixth embodiment.

FIG. 21 is TABLE 12 which lists the aspheric surface data of the sixth embodiment.

FIG. 22 is TABLE 13 which lists the optical data of the seventh embodiment.

FIG. 23 is TABLE 14 which lists the aspheric surface data of the seventh embodiment.

FIG. 24 is TABLE 15 which lists the optical data of the eighth embodiment.

FIG. 25 is TABLE 16 which lists the aspheric surface data of the eighth embodiment.

FIG. 26 is TABLE 17 which lists the optical data of the ninth embodiment.

FIG. 27 is TABLE 18 which lists the data resulting from the respective equations in accordance with the first through ninth embodiments.

DETAILED DESCRIPTION OF THE PREFERRED EMBODIMENTS

Figure 1A:
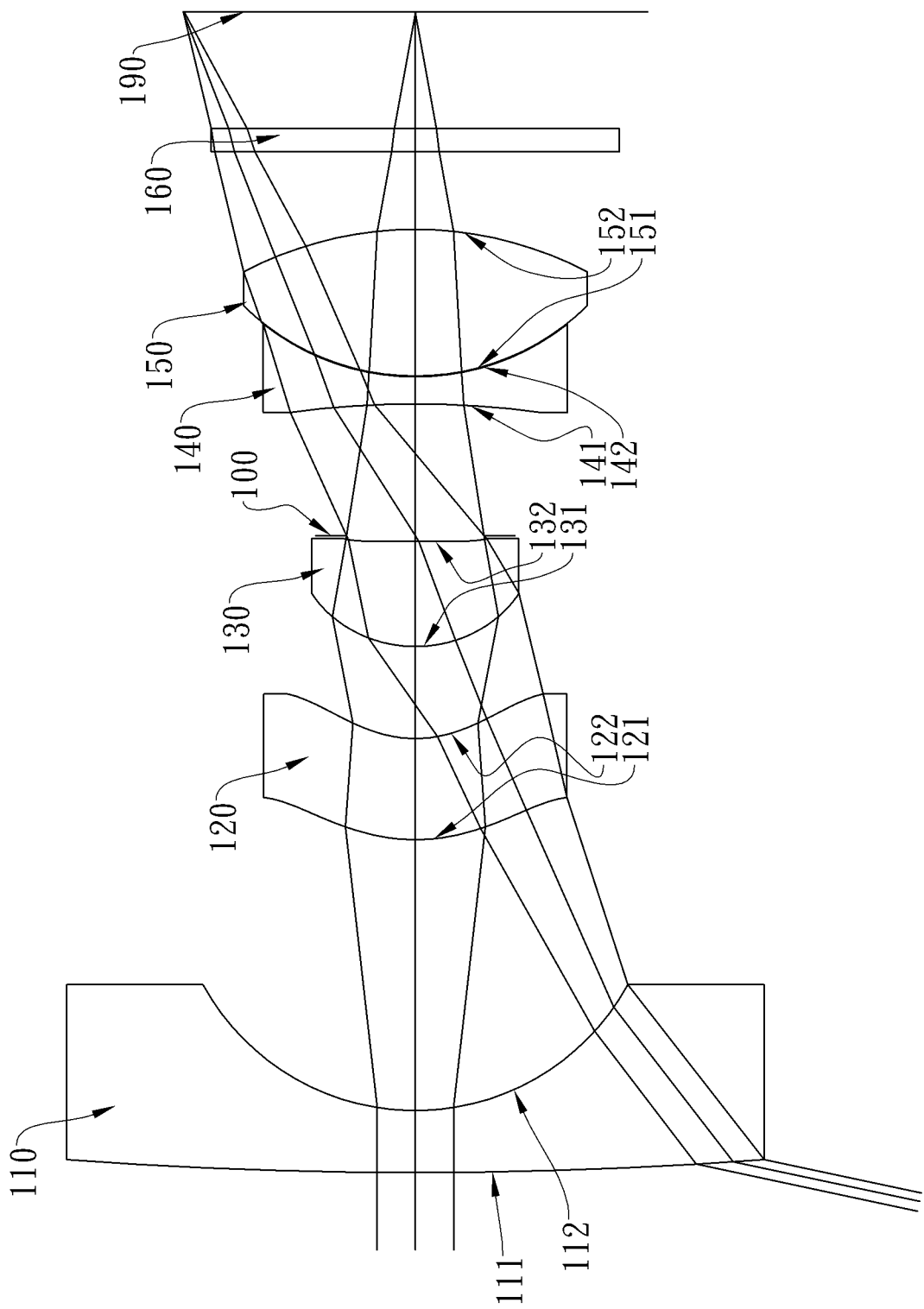
FIG. 1A shows a wide-angle imaging lens assembly in accordance with the first embodiment of the present invention.

The present invention provides a wide-angle imaging lens assembly comprising, in order from an object side to an image side: a first lens element with negative refractive power having a convex object-side surface and a concave image-side surface; a second lens element with negative refractive power having a convex object-side surface and a concave image-side surface; a third lens element with positive refractive power; a fourth lens element with negative refractive power having a concave image-side surface; and a fifth lens element with positive refractive power; wherein the two lens elements with refractive power closest to the object side are the first lens element and the second lens element; wherein the number of lens elements with refractive power does not exceed six; wherein the wide-angle imaging lens assembly is further provided with an electronic sensor for image formation of the object; and wherein a focal length of the first lens element is f1, a focal length of the second lens element is f2, a distance on an optical axis between the second lens element and the third lens element is T23, a distance on the optical axis between the first lens element and the second lens element is T12, a radius of curvature of the image-side surface of the fourth lens element is R8, a radius of curvature of the object-side surface of the fourth lens element is R7, a focal length of the wide-angle imaging lens assembly is f, half of a diagonal length of an effective pixel area of the electronic sensor is ImgH, and they satisfy the relations: 0<f1/f2<2.00; 0.15<T23/T12<0.69; −1.40<R8/R7<0.70; and 0.30<f/ImgH<1.25.

When the relation of 0<f1/f2<2.00 is satisfied, the refractive power of the first lens element and the second lens element can be distributed more appropriately, thereby a wide field of view can be favorably achieved and the aberration of the optical system can be prevented from increasing excessively. Preferably, f1 and f2 satisfy the relation: 0<f1/f2<1.2. When the relation of 0.15<T23/T12<0.69 is satisfied, the distance between any two of the first, second and third lens elements is more appropriate, so that it is not too short and makes the assembling process difficult, or too long and affects the size reduction of the lens assembly. When the relation of −1.40<R8/R7<0.70 is satisfied, the fourth lens element can provide sufficient negative refractive power, thereby the chromatic aberration of the optical system can be favorably corrected to increase the resolution of the optical system. When the relation of 0.30<f/ImgH<1.25 is satisfied, a sufficient field of view can be favorably achieved for the wide-angle imaging lens assembly. Preferably, f and ImgH satisfy the relation: 0.40<f/ImgH<1.10.

In the aforementioned wide-angle imaging lens assembly, it is preferable that the fifth lens element has a convex object-side surface and a convex image-side surface so that the positive refractive power of the fifth lens element can be enhanced, thereby the refractive power of the third lens element can be favorably distributed to attenuate the sensitivity of the optical system.

In the aforementioned wide-angle imaging lens assembly, the radius of curvature of the object-side surface of the first lens element is R1, the radius of curvature of the image-side surface of the first lens element is R2, and they preferably satisfy the relation: 1.03<(R1+R2)/(R1−R2)<3.00. When the above relation is satisfied, the first lens element can maintain a meniscus shape effectively; this allows the refraction of incident light to be more moderate as the field of view of the optical system is enlarged, thereby preventing the aberration from increasing excessively.

In the aforementioned wide-angle imaging lens assembly, it is preferable that the second lens element is made of plastic material and the surfaces thereof are aspheric.

In the aforementioned wide-angle imaging lens assembly, it is preferable that a stop is disposed between the second lens element and the fourth lens element. The distance on the optical axis between the stop and the electronic sensor is SL, the distance on the optical axis between the object-side surface of the first lens element and the electronic sensor is TTL, and they satisfy the relation: 0.30<SL/TTL<0.65. When the above relation is satisfied, a balance between miniaturization of the lens assembly and enlarging the field of view of the optical system can be favorably achieved.

Preferably, the aforementioned wide-angle imaging lens assembly comprises at least one aspheric lens element. Aspheric surfaces can be easily made into non-spherical profiles, allowing more design parameter freedom which can be used to reduce aberrations and the number of lens elements. Accordingly, the total track length of the wide-angle imaging lens assembly can be effectively reduced.

In the aforementioned wide-angle imaging lens assembly, the Abbe number of the first lens element is V1, the Abbe number of the second lens element is V2, and they preferably satisfy the relation: 20<V1−V2<50. When the above relation is satisfied, the wide-angle imaging lens assembly's capability to correct the chromatic aberration can be favorably enhanced.

In the aforementioned wide-angle imaging lens assembly, it is preferable that the number of lens elements with refractive power is five.

In the aforementioned wide-angle imaging lens assembly, it is preferable that the fourth lens element has a concave image-side surface so that the chromatic aberration of the optical system can be favorably corrected.

In the aforementioned wide-angle imaging lens assembly, it is preferable that the fourth lens element and the fifth lens element are adhered together to form a doublet lens element and thereby to correct the chromatic aberration of the optical system more effectively.

In the aforementioned wide-angle imaging lens assembly, the distance on the optical axis between the object-side surface of the first lens element and the electronic sensor is TTL, half of the diagonal length of the effective pixel area of the electronic sensor is ImgH, and they preferably satisfy the relation: TTL/ImgH<8.6. Preferably, TTL and ImgH satisfy the relation: TTL/ImgH<6.0.

The present invention provides another wide-angle imaging lens assembly comprising, in order from an object side to an image side: a first lens element with negative refractive power having a concave image-side surface; a second lens element with negative refractive power having a concave image-side surface; a third lens element with positive refractive power; a fourth lens element with negative refractive power; and a fifth lens element with positive refractive power; wherein the wide-angle imaging lens assembly is further provided with a stop and an electronic sensor, the stop is disposed between the second lens element and the fourth lens element, the electronic sensor is disposed at the image plane for image formation of an object; wherein the two lens elements with refractive power closest to the object side are the first lens element and the second lens element; wherein the number of lens elements with refractive power does not exceed six; and wherein a focal length of the first lens element is f1, a focal length of the second lens element is f2, a distance on an optical axis between the stop and the electronic sensor is SL, a distance on the optical axis between an object-side surface of the first lens element and the electronic sensor is TTL, half of a diagonal length of an effective pixel area of the electronic sensor is ImgH, and they satisfy the relations: 0<f1/f2<2.00, 0.20<SL/TTL<0.85, TTL/ImgH<8.6.

When the relation of 0<f1/f2<2.00 is satisfied, the refractive power of the first lens element and the second lens element can be distributed more appropriately, thereby a wide field of view can be favorably achieved and the aberration of the optical system can be prevented from increasing excessively. Preferably, f1 and f2 satisfy the relation: 0<f1/f2<1.2. When the relation of 0.20<SL/TTL<0.85 is satisfied, a balance between miniaturization of the lens assembly and enlarging the field of view of the optical system can be favorably achieved. When the relation of TTL/ImgH<8.6 is satisfied, the field of view can be favorably enlarged and the total track length of the lens assembly can be reduced.

In the aforementioned wide-angle imaging lens assembly, the stop is disposed between the second lens element and the fourth lens element. By arranging at least two lens elements with negative refractive power in front of the stop, a sufficient field of view can be achieved for the optical system. Moreover, the disposition of at least two lens elements behind the stop facilitates correcting the aberration of the optical system so that the image quality can be improved. Also, such arrangement of the stop can help attenuate the sensitivity of the optical system.

In the aforementioned wide-angle imaging lens assembly, the two lens elements with refractive power closest to the object side are the first lens element and the second lens element, so that the field of view of the optical system can be favorably enlarged. Moreover, the balanced distribution of negative refractive power by the two lens elements with negative refractive power can prevent the aberration of the optical system from increasing excessively.

In the aforementioned wide-angle imaging lens assembly, the number of lens elements with refractive power does not exceed six. For example, a sixth lens element may be disposed between any two of the second through fifth lens elements so as to favorably correct the high order aberrations of the optical system. Accordingly, the optical system can obtain better image quality.

In the aforementioned wide-angle imaging lens assembly, the radius of curvature of the object-side surface of the first lens element is R1, the radius of curvature of the image-side surface of the first lens element is R2, and they preferably satisfy the relation: 1.03<(R1+R2)/(R1−R2)<3.00. When the above relation is satisfied, the first lens element can maintain a meniscus shape effectively; this allows the refraction of incident light to be more moderate as the field of view of the optical system is enlarged, thereby preventing the aberration from increasing excessively.

In the aforementioned wide-angle imaging lens assembly, it is preferable that the number of lens elements with refractive power is five.

In the aforementioned wide-angle imaging lens assembly, the focal length of the wide-angle imaging lens assembly is f, half of the diagonal length of the effective pixel area of the electronic sensor is ImgH, and they preferably satisfy the relation: 0.40<f/ImgH<1.10. When the above relation is satisfied, a sufficient field of view can be favorably achieved for the wide-angle imaging lens assembly.

In the aforementioned wide-angle imaging lens assembly, the radius of curvature of the image-side surface of the fourth lens element is R8, the radius of curvature of the object-side surface of the fourth lens element is R7, and they preferably satisfy the relation: −1.40<R8/R7<0.70. When the above relation is satisfied, the fourth lens element can provide sufficient negative refractive power, thereby favorably correcting the chromatic aberration of the optical system. Accordingly, the resolution of the optical system can be increased.

In the aforementioned wide-angle imaging lens assembly, it is preferable that the object-side and image-side surfaces of the fourth lens element are both concave so that the chromatic aberration of the optical system can be favorably corrected.

The present invention provides yet another wide-angle imaging lens assembly comprising, in order from an object side to an image side: a first lens element with negative refractive power having a concave image-side surface; a second lens element with negative refractive power having a convex object-side surface and a concave image-side surface; a third lens element with positive refractive power; a fourth lens element with negative refractive power having a concave image-side surface; and a fifth lens element with positive refractive power; wherein the number of lens elements with refractive power is five; wherein the wide-angle imaging lens assembly is further provided with an electronic sensor for image formation of an object; and wherein a thickness of the fourth lens element on an optical axis is CT4, a radius of curvature of the image-side surface of the fourth lens element is R8, a focal length of the wide-angle imaging lens assembly is f, half of a diagonal length of an effective pixel area of the electronic sensor is ImgH, and they satisfy the relations: 0<CT4/R8<0.70, 0.30<f/ImgH<1.25.

When the relation of 0<CT4/R8<0.70 is satisfied, the thickness and curvature of the fourth lens element can be prevented from becoming too large, thereby the image quality can be favorably improved.

In the aforementioned wide-angle imaging lens assembly, the radius of curvature of the object-side surface of the first lens element is R1, the radius of curvature of the image-side surface of the first lens element is R2, and they preferably satisfy the relation: 1.03<(R1+R2)/(R1−R2)<3.00. When the above relation is satisfied, the first lens element can maintain a meniscus shape effectively; this allows the refraction of incident light to be more moderate as the field of view of the optical system is enlarged, thereby preventing the aberration from increasing excessively.

In the aforementioned wide-angle imaging lens assembly, the focal length of the first lens element is f1, the focal length of the second lens element is f2, and they preferably satisfy the relation: 0<f1/f2<1.20. When the above relation is satisfied, the refractive power of the first lens element and the second lens element can be distributed more appropriately, thereby a wide field of view can be favorably achieved and the aberration of the optical system can be prevented from increasing excessively.

In the aforementioned wide-angle imaging lens assembly, it is preferable that the fourth lens element has a concave object-side surface so that the chromatic aberration of the optical system can be favorably corrected.

In the present wide-angle imaging lens assembly, the lens elements can be made of glass or plastic material. If the lens elements are made of glass, there is more freedom in distributing the refractive power of the optical system. If plastic material is adopted to produce the lens elements, the production cost will be reduced effectively.

In the present wide-angle imaging lens assembly, if a lens element has a convex surface, it means the portion of the surface in proximity to the optical axis is convex; if a lens element has a concave surface, it means the portion of the surface in proximity to the optical axis is concave.

Preferred embodiments of the present invention will be described in the following paragraphs by referring to the accompanying drawings.

Figure 1B:
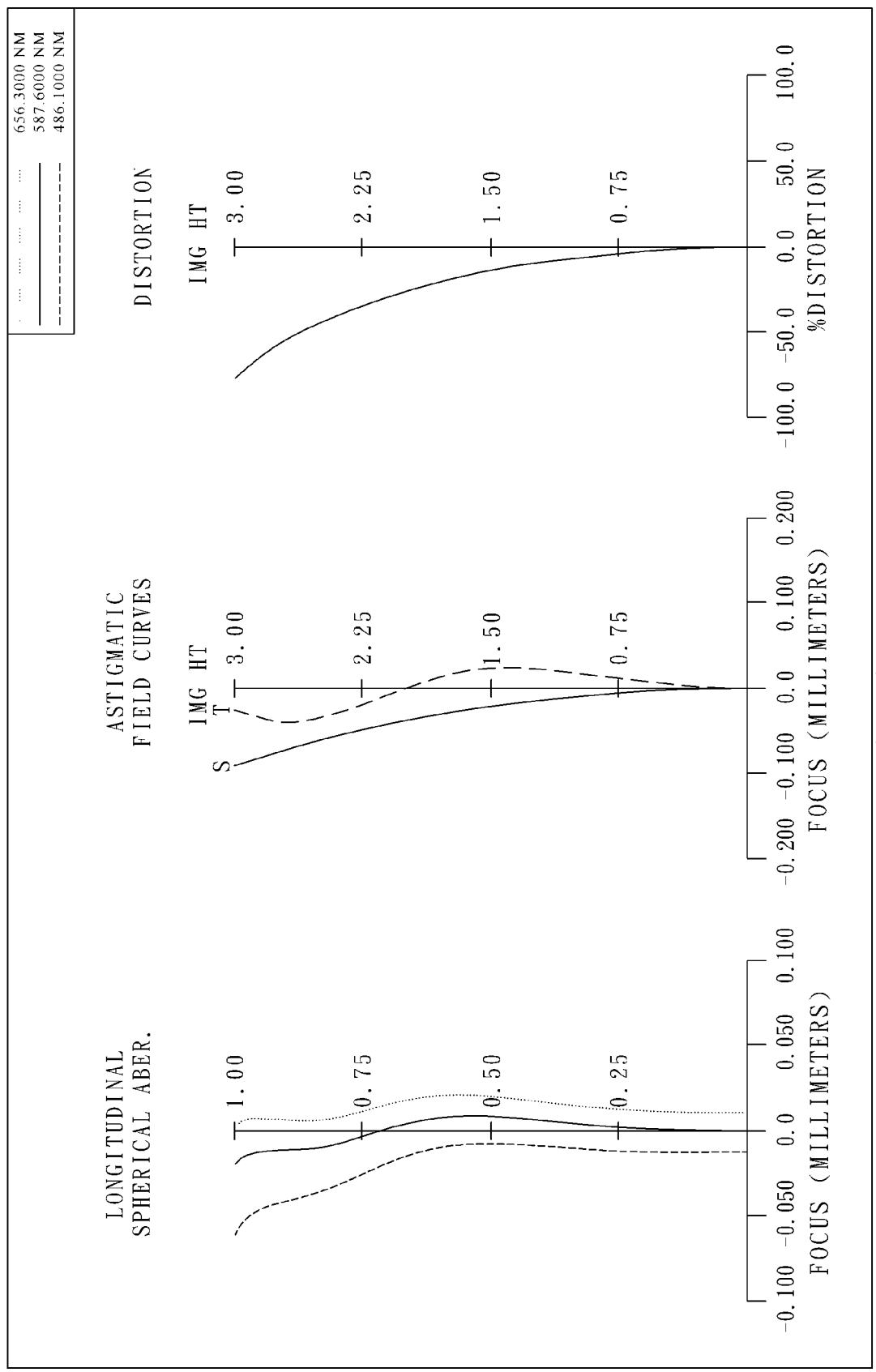
FIG. 1B shows the aberration curves of the first embodiment of the present invention.

FIG. 1A shows a wide-angle imaging lens assembly in accordance with the first embodiment of the present invention, and FIG. 1B shows the aberration curves of the first embodiment of the present invention. In the first embodiment of the present invention, there is a wide-angle imaging lens assembly mainly comprising five lens elements, in order from an object side to an image side: a glass first lens element 110 with negative refractive power having a convex object-side surface 111 and a concave image-side surface 112; a plastic second lens element 120 with negative refractive power having a convex object-side surface 121 and a concave image-side surface 122, the object-side and image-side surfaces 121 and 122 thereof being aspheric; a plastic third lens element 130 with positive refractive power having a convex object-side surface 131 and a convex image-side surface 132, the object-side and image-side surfaces 131 and 132 thereof being aspheric; a glass fourth lens element 140 with negative refractive power having a concave object-side surface 141 and a concave image-side surface 142; and a glass fifth lens element 150 with positive refractive power having a convex object-side surface 151 and a convex image-side surface 152; wherein the fourth lens element 140 and the fifth lens element 150 are adhered together to form a doublet lens. Moreover, the wide-angle imaging lens assembly is provided with a stop 100 and an electronic sensor, the stop 100 is disposed between the third lens element 130 and the fourth lens element 140, the electronic sensor is disposed at the image plane 190 for image formation of an object. The wide-angle imaging lens assembly further comprises an IR-filter 160 disposed between the image-side surface 152 of the fifth lens element 150 and the image plane 190; the IR-filter 160 is made of glass and has no influence on the focal length of the wide-angle imaging lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:
X: the height of a point on the aspheric surface at a distance Y from the optical axis relative to the tangential plane at the aspheric surface vertex;
Y: the distance from the point on the curve of the aspheric surface to the optical axis;
k: the conic coefficient;
Ai: the aspheric coefficient of order i.

In the first embodiment of the present wide-angle imaging lens assembly, the focal length of the wide-angle imaging lens assembly is f, and it satisfies the relation: f=2.78 (mm).

In the first embodiment of the present wide-angle imaging lens assembly, the f-number of the wide-angle imaging lens assembly is Fno, and it satisfies the relation: Fno=2.80.

In the first embodiment of the present wide-angle imaging lens assembly, half of the maximal field of view of the wide-angle imaging lens assembly is HFOV, and it satisfies the relation: HFOV=78.0 deg.

In the first embodiment of the present wide-angle imaging lens assembly, the Abbe number of the first lens element 110 is V1, the Abbe number of the second lens element 120 is V2, and they satisfy the relation: V1−V2=33.3.

In the first embodiment of the present wide-angle imaging lens assembly, the focal length of the first lens element 110 is f1, the focal length of the second lens element 120 is f2, and they satisfy the relation: f1/f2=0.26.

In the first embodiment of the present wide-angle imaging lens assembly, the radius of curvature of the image-side surface 142 of the fourth lens element 140 is R8, the radius of curvature of the object-side surface 141 of the fourth lens element 140 is R7, and they satisfy the relation: R8/R7=−0.26. In the first embodiment of the present wide-angle imaging lens assembly, the radius of curvature of the object-side surface 111 of the first lens element 110 is R1, the radius of curvature of the image-side surface 112 of the first lens element 110 is R2, and they satisfy the relation: (R1+R2)/(R1−R2)=1.11.

In the first embodiment of the present wide-angle imaging lens assembly, the distance on the optical axis between the second lens element 120 and the third lens element 130 is T23, the distance on the optical axis between the first lens element 110 and the second lens element 120 is T12, and they satisfy the relation: T23/T12=0.34.

In the first embodiment of the present wide-angle imaging lens assembly, the thickness of the fourth lens element 140 on the optical axis is CT4, the radius of curvature of the image-side surface 142 of the fourth lens element 140 is R8, and they satisfy the relation: CT4/R8=0.11.

In the first embodiment of the present wide-angle imaging lens assembly, the focal length of the wide-angle imaging lens assembly is f, half of the diagonal length of the effective pixel area of the electronic sensor is ImgH, and they satisfy the relation: f/ImgH=0.93.

In the first embodiment of the present wide-angle imaging lens assembly, the distance on the optical axis between the stop 100 and the electronic sensor is SL, the distance on the optical axis between the object-side surface 111 of the first lens element 110 and the electronic sensor is TTL, half of the diagonal length of the effective pixel area of the electronic sensor is ImgH, and they satisfy the relations: SL/TTL=0.45, TTL/ImgH=4.97.

The detailed optical data of the first embodiment is shown in FIG. 10 (TABLE 1), and the aspheric surface data is shown in FIG. 11 (TABLE 2), wherein the units of the radius of curvature, the thickness and the focal length are expressed in mm, and HFOV is half of the maximal field of view.

Figure 2A:
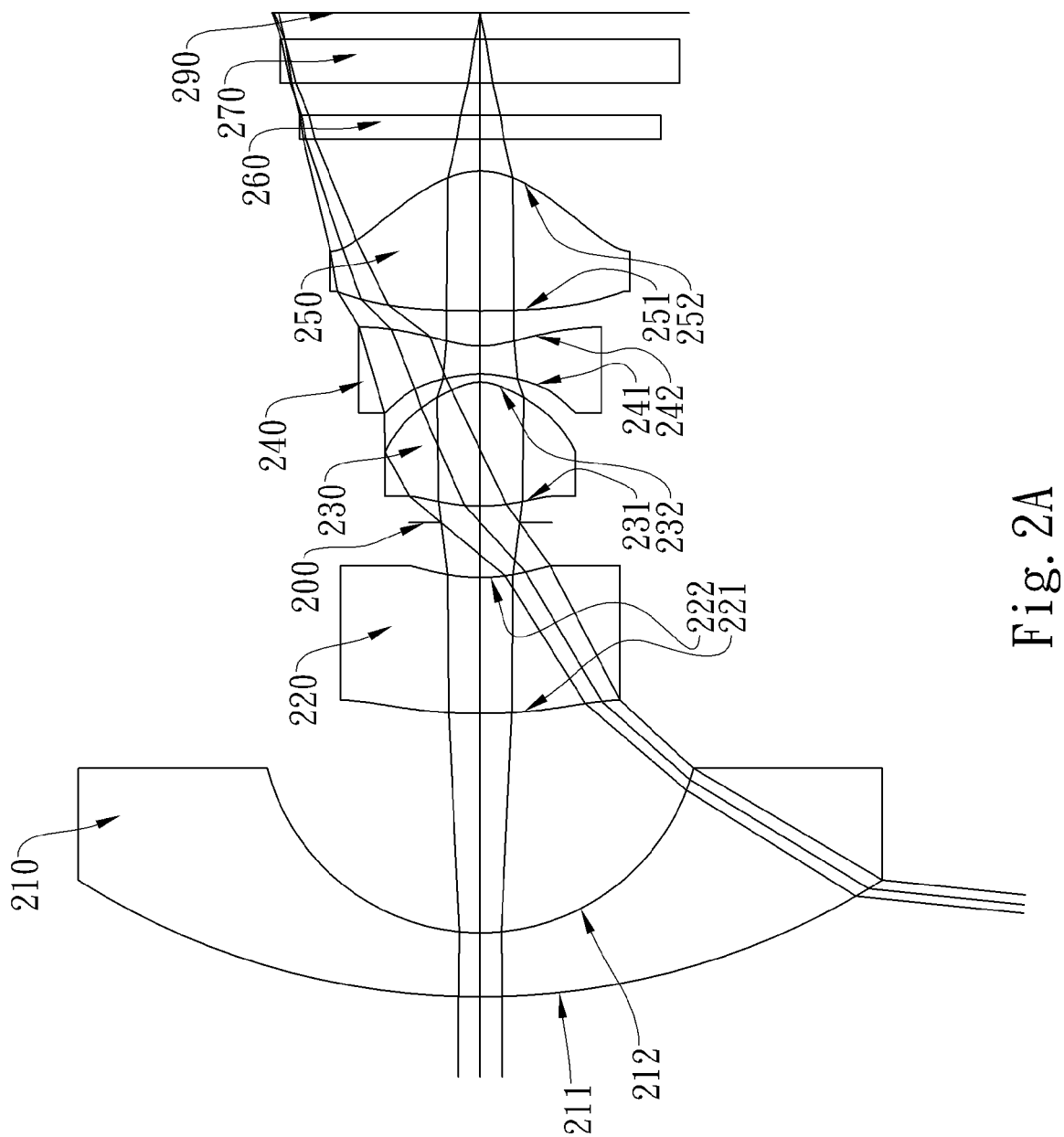
FIG. 2A shows a wide-angle imaging lens assembly in accordance with the second embodiment of the present invention.
Figure 2B:
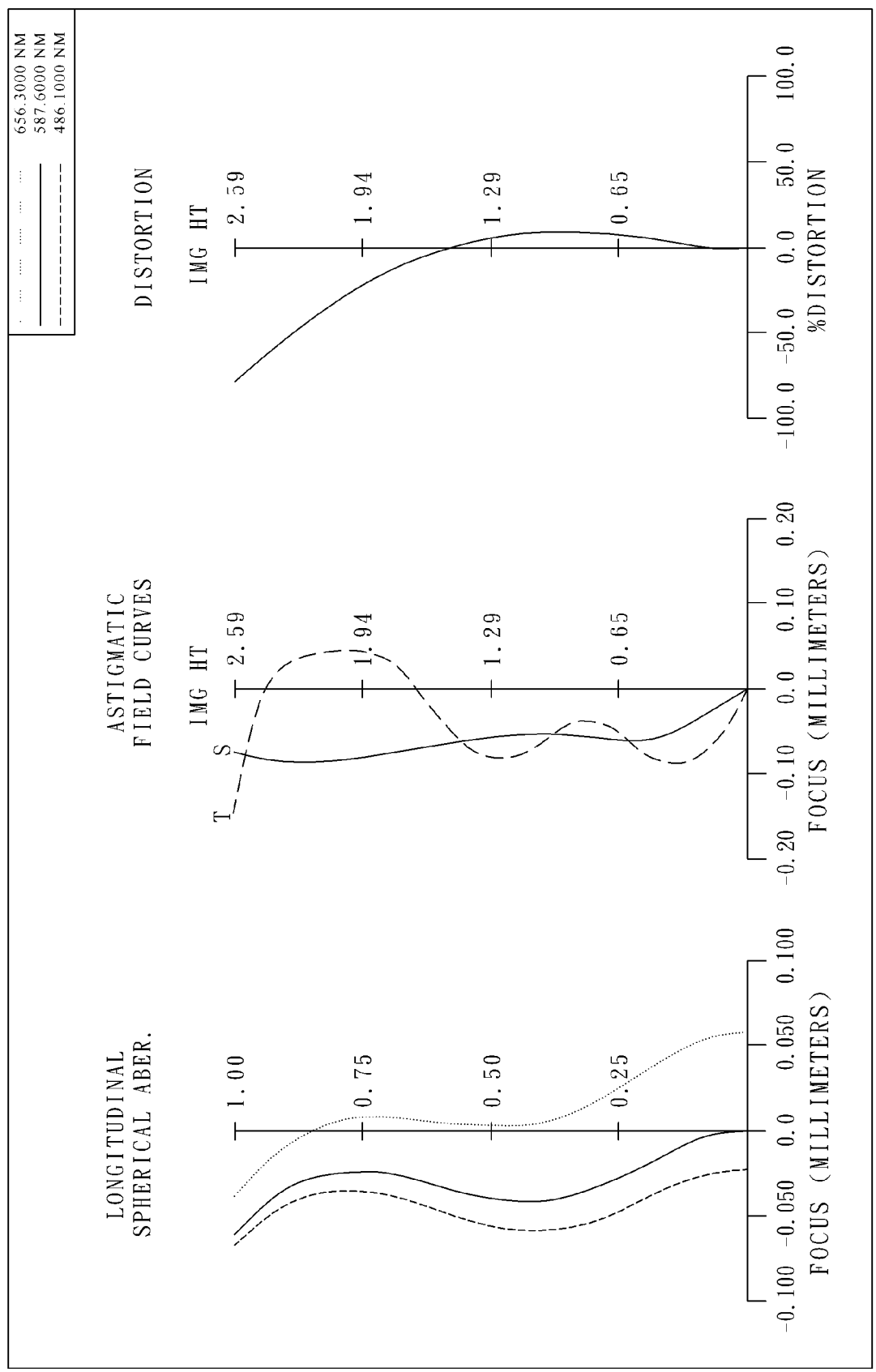
FIG. 2B shows the aberration curves of the second embodiment of the present invention.

FIG. 2A shows a wide-angle imaging lens assembly in accordance with the second embodiment of the present invention, and FIG. 2B shows the aberration curves of the second embodiment of the present invention. In the second embodiment of the present invention, there is a wide-angle imaging lens assembly mainly comprising five lens elements, in order from an object side to an image side: a glass first lens element 210 with negative refractive power having a convex object-side surface 211 and a concave image-side surface 212; a plastic second lens element 220 with negative refractive power having a convex object-side surface 221 and a concave image-side surface 222, the object-side and image-side surfaces 221 and 222 thereof being aspheric; a plastic third lens element 230 with positive refractive power having a convex object-side surface 231 and a convex image-side surface 232, the object-side and image-side surfaces 231 and 232 thereof being aspheric; a plastic fourth lens element 240 with negative refractive power having a concave object-side surface 241 and a concave image-side surface 242, the object-side and image-side surfaces 241 and 242 thereof being aspheric; and a plastic fifth lens element 250 with positive refractive power having a convex object-side surface 251 and a convex image-side surface 252, the object-side and image-side surfaces 251 and 252 thereof being aspheric. Moreover, the wide-angle imaging lens assembly is provided with a stop 200 and an electronic sensor, the stop 200 is disposed between the second lens element 220 and the third lens element 230, the electronic sensor is disposed at the image plane 290 for image formation of an object. The wide-angle imaging lens assembly further comprises an IR-filter 260 and a cover-glass 270 sequentially disposed between the image-side surface 252 of the fifth lens element 250 and the image plane 290; the IR-filter 260 and the cover-glass 270 are made of glass and have no influence on the focal length of the wide-angle imaging lens assembly.

The equation of the aspheric surface profiles of the second embodiment has the same form as that of the first embodiment.

In the second embodiment of the present wide-angle imaging lens assembly, the focal length of the wide-angle imaging lens assembly is f, and it satisfies the relation: f=1.19 (mm).

In the second embodiment of the present wide-angle imaging lens assembly, the f-number of the wide-angle imaging lens assembly is Fno, and it satisfies the relation: Fno=2.20.

In the second embodiment of the present wide-angle imaging lens assembly, half of the maximal field of view of the wide-angle imaging lens assembly is HFOV, and it satisfies the relation: HFOV=84.1 deg. In the second embodiment of the present wide-angle imaging lens assembly, the Abbe number of the first lens element 210 is V1, the Abbe number of the second lens element 220 is V2, and they satisfy the relation: V1−V2=31.3.

In the second embodiment of the present wide-angle imaging lens assembly, the focal length of the first lens element 210 is f1, the focal length of the second lens element 220 is f2, and they satisfy the relation: f1/f2=0.94.

In the second embodiment of the present wide-angle imaging lens assembly, the radius of curvature of the image-side surface 242 of the fourth lens element 240 is R8, the radius of curvature of the object-side surface 241 of the fourth lens element 240 is R7, and they satisfy the relation: R8/R7=−0.75.

In the second embodiment of the present wide-angle imaging lens assembly, the radius of curvature of the object-side surface 211 of the first lens element 210 is R1, the radius of curvature of the image-side surface 212 of the first lens element 210 is R2, and they satisfy the relation: (R1+R2)/(R1−R2)=1.83.

In the second embodiment of the present wide-angle imaging lens assembly, the distance on the optical axis between the second lens element 220 and the third lens element 230 is T23, the distance on the optical axis between the first lens element 210 and the second lens element 220 is T12, and they satisfy the relation: T23/T12=0.33.

In the second embodiment of the present wide-angle imaging lens assembly, the thickness of the fourth lens element 240 on the optical axis is CT4, the radius of curvature of the image-side surface 242 of the fourth lens element 240 is R8, and they satisfy the relation: CT4/R8=0.36.

In the second embodiment of the present wide-angle imaging lens assembly, the focal length of the wide-angle imaging lens assembly is f, half of the diagonal length of the effective pixel area of the electronic sensor is ImgH, and they satisfy the relation: f/ImgH=0.46.

In the second embodiment of the present wide-angle imaging lens assembly, the distance on the optical axis between the stop 200 and the electronic sensor is SL, the distance on the optical axis between the object-side surface 211 of the first lens element 210 and the electronic sensor is TTL, half of the diagonal length of the effective pixel area of the electronic sensor is ImgH, and they satisfy the relations: SL/TTL=0.51, TTL/ImgH=4.63.

The detailed optical data of the second embodiment is shown in FIG. 12 (TABLE 3), and the aspheric surface data is shown in FIG. 13 (TABLE 4), wherein the units of the radius of curvature, the thickness and the focal length are expressed in mm, and HFOV is half of the maximal field of view.

Figure 3A:
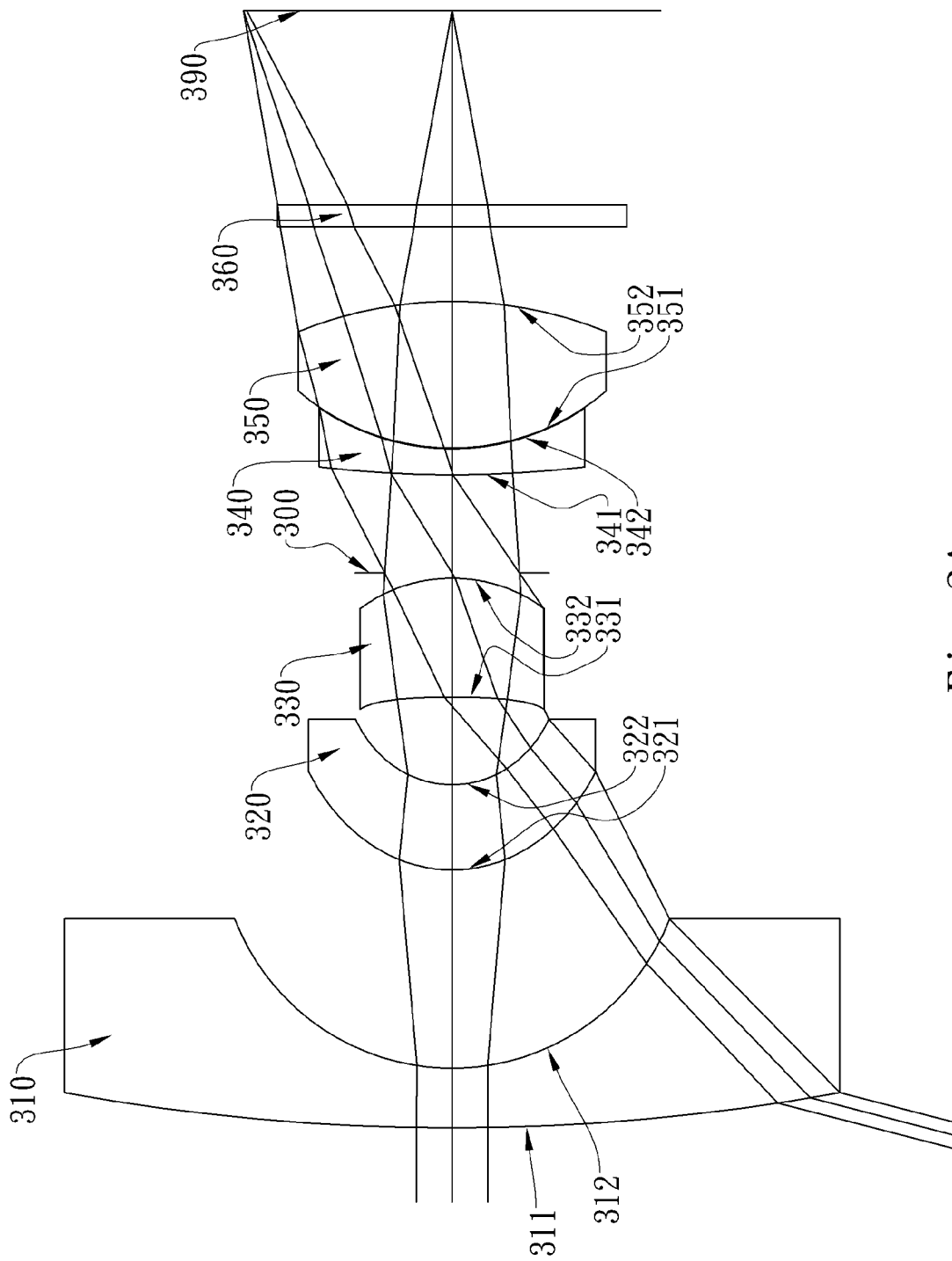
FIG. 3A shows a wide-angle imaging lens assembly in accordance with the third embodiment of the present invention.
Figure 3B:
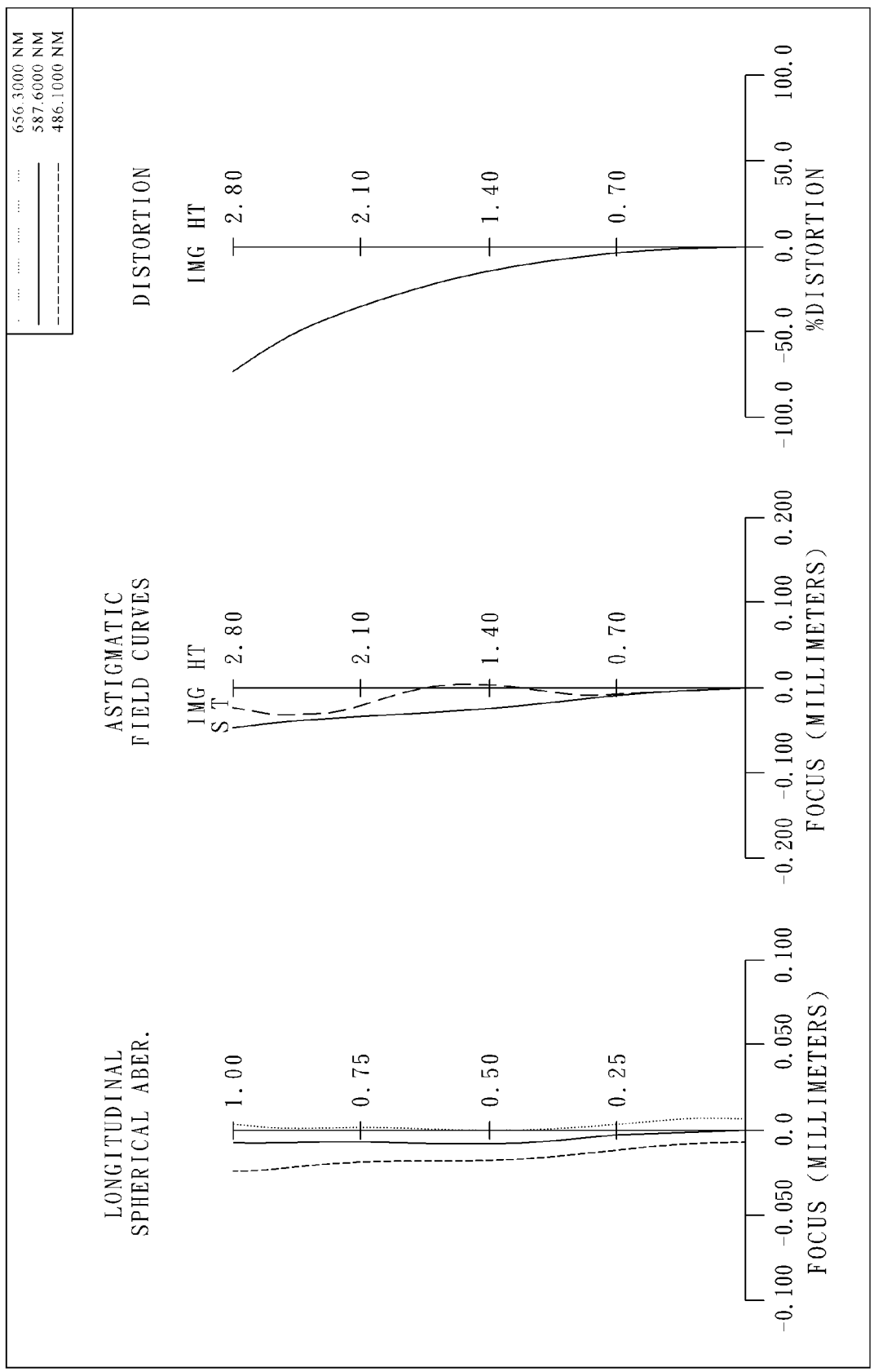
FIG. 3B shows the aberration curves of the third embodiment of the present invention.

FIG. 3A shows a wide-angle imaging lens assembly in accordance with the third embodiment of the present invention, and FIG. 3B shows the aberration curves of the third embodiment of the present invention. In the third embodiment of the present invention, there is a wide-angle imaging lens assembly mainly comprising five lens elements, in order from an object side to an image side: a glass first lens element 310 with negative refractive power having a convex object-side surface 311 and a concave image-side surface 312; a plastic second lens element 320 with negative refractive power having a convex object-side surface 321 and a concave image-side surface 322, the object-side and image-side surfaces 321 and 322 thereof being aspheric; a plastic third lens element 330 with positive refractive power having a concave object-side surface 331 and a convex image-side surface 332, the object-side and image-side surfaces 331 and 332 thereof being aspheric; a glass fourth lens element 340 with negative refractive power having a convex object-side surface 341 and a concave image-side surface 342; and a glass fifth lens element 350 with positive refractive power having a convex object-side surface 351 and a convex image-side surface 352; wherein the fourth lens element 340 and the fifth lens element 350 are adhered together to form a doublet lens. Moreover, the wide-angle imaging lens assembly is provided with a stop 300 and an electronic sensor, the stop 300 is disposed between the third lens element 330 and the fourth lens element 340, the electronic sensor is disposed at the image plane 390 for image formation of an object. The wide-angle imaging lens assembly further comprises an IR-filter 360 disposed between the image-side surface 352 of the fifth lens element 350 and the image plane 390; the IR-filter 360 is made of glass and has no influence on the focal length of the wide-angle imaging lens assembly.

The equation of the aspheric surface profiles of the third embodiment has the same form as that of the first embodiment.

In the third embodiment of the present wide-angle imaging lens assembly, the focal length of the wide-angle imaging lens assembly is f, and it satisfies the relation: f=2.68 (mm).

In the third embodiment of the present wide-angle imaging lens assembly, the f-number of the wide-angle imaging lens assembly is Fno, and it satisfies the relation: Fno=2.8.

In the third embodiment of the present wide-angle imaging lens assembly, half of the maximal field of view of the wide-angle imaging lens assembly is HFOV, and it satisfies the relation: HFOV=75.5 deg.

In the third embodiment of the present wide-angle imaging lens assembly, the Abbe number of the first lens element 310 is V1, the Abbe number of the second lens element 320 is V2, and they satisfy the relation: V1−V2=36.5.

In the third embodiment of the present wide-angle imaging lens assembly, the focal length of the first lens element 310 is f1, the focal length of the second lens element 320 is f2, and they satisfy the relation: f1/f2=0.13.

In the third embodiment of the present wide-angle imaging lens assembly, the radius of curvature of the image-side surface 342 of the fourth lens element 340 is R8, the radius of curvature of the object-side surface 341 of the fourth lens element 340 is R7, and they satisfy the relation: R8/R7=0.21.

In the third embodiment of the present wide-angle imaging lens assembly, the radius of curvature of the object-side surface 311 of the first lens element 310 is R1, the radius of curvature of the image-side surface 312 of the first lens element 310 is R2, and they satisfy the relation: (R1+R2)/(R1−R2)=1.24.

In the third embodiment of the present wide-angle imaging lens assembly, the distance on the optical axis between the second lens element 320 and the third lens element 330 is T23, the distance on the optical axis between the first lens element 310 and the second lens element 320 is T12, and they satisfy the relation: T23/T12=0.44.

In the third embodiment of the present wide-angle imaging lens assembly, the thickness of the fourth lens element 340 on the optical axis is CT4, the radius of curvature of the image-side surface 342 of the fourth lens element 340 is R8, and they satisfy the relation: CT4/R8=0.11.

In the third embodiment of the present wide-angle imaging lens assembly, the focal length of the wide-angle imaging lens assembly is f, half of the diagonal length of the effective pixel area of the electronic sensor is ImgH, and they satisfy the relation: f/ImgH=0.96.

In the third embodiment of the present wide-angle imaging lens assembly, the distance on the optical axis between the stop 300 and the electronic sensor is SL, the distance on the optical axis between the object-side surface 311 of the first lens element 310 and the electronic sensor is TTL, half of the diagonal length of the effective pixel area of the electronic sensor is ImgH, and they satisfy the relations: SL/TTL=0.50, TTL/ImgH=5.32.

The detailed optical data of the third embodiment is shown in FIG. 14 (TABLE 5), and the aspheric surface data is shown in FIG. 15 (TABLE 6), wherein the units of the radius of curvature, the thickness and the focal length are expressed in mm, and HFOV is half of the maximal field of view.

Figure 4A:
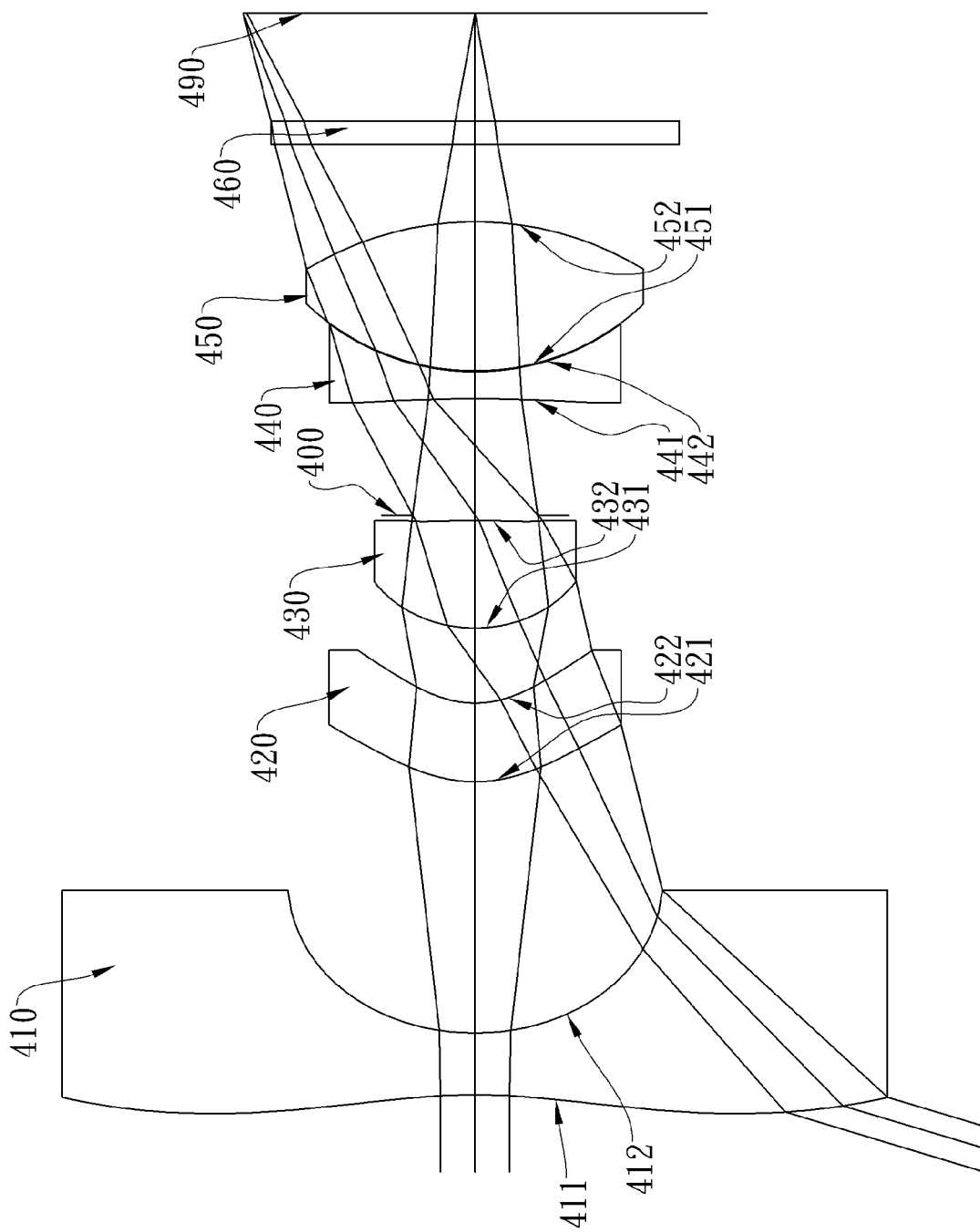
FIG. 4A shows a wide-angle imaging lens assembly in accordance with the fourth embodiment of the present invention.
Figure 4B:
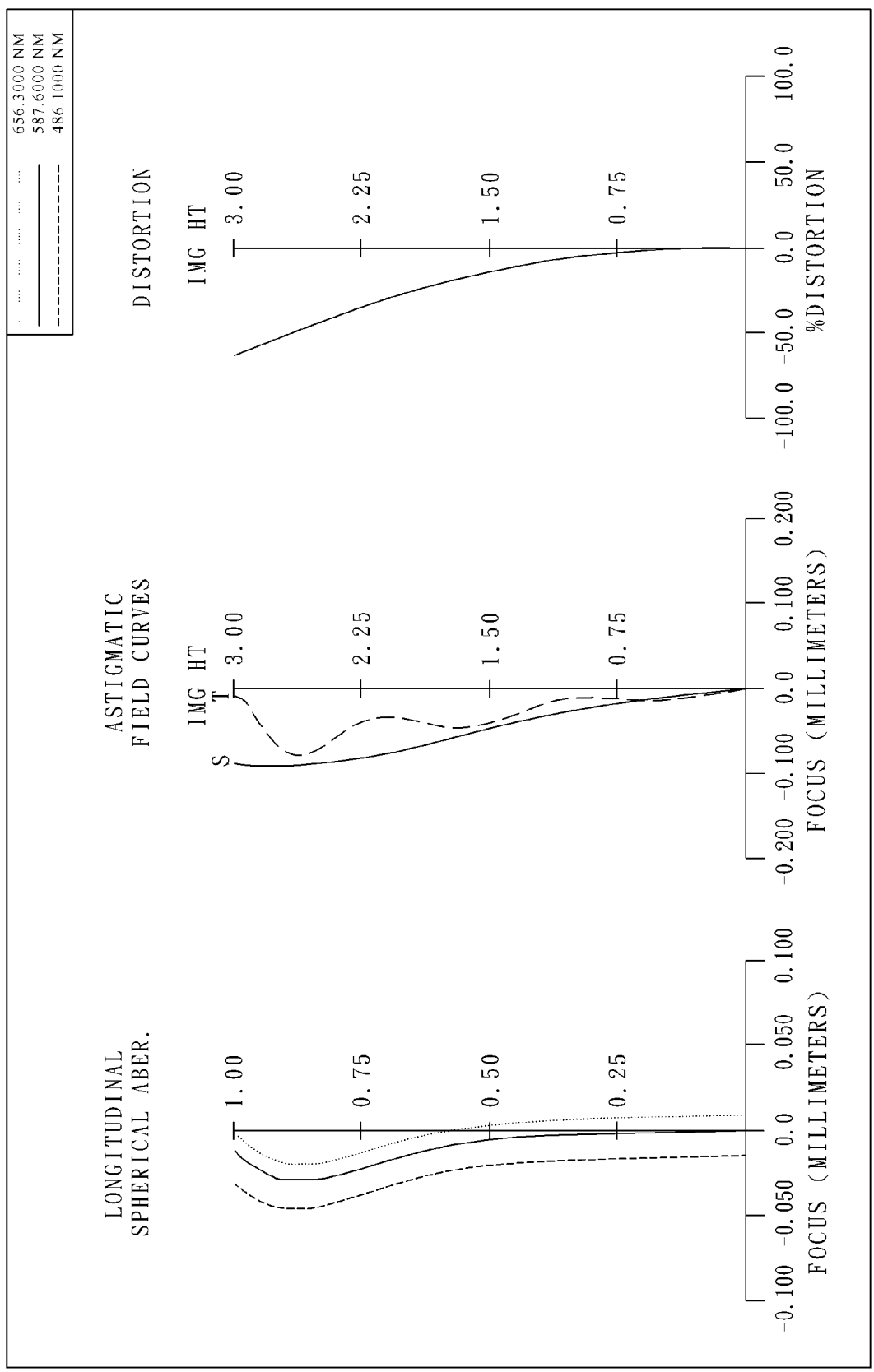
FIG. 4B shows the aberration curves of the fourth embodiment of the present invention.

FIG. 4A shows a wide-angle imaging lens assembly in accordance with the fourth embodiment of the present invention, and FIG. 4B shows the aberration curves of the fourth embodiment of the present invention. In the fourth embodiment of the present invention, there is a wide-angle imaging lens assembly mainly comprising five lens elements, in order from an object side to an image side: a plastic first lens element 410 with negative refractive power having a concave object-side surface 411 and a concave image-side surface 412, the object-side and image-side surfaces 411 and 412 thereof being aspheric; a plastic second lens element 420 with negative refractive power having a convex object-side surface 421 and a concave image-side surface 422, the object-side and image-side surfaces 421 and 422 thereof being aspheric; a plastic third lens element 430 with positive refractive power having a convex object-side surface 431 and a convex image-side surface 432, the object-side and image-side surfaces 431 and 432 thereof being aspheric; a glass fourth lens element 440 with negative refractive power having a concave object-side surface 441 and a concave image-side surface 442; and a glass fifth lens element 450 with positive refractive power having a convex object-side surface 451 and a convex image-side surface 452; wherein the fourth lens element 440 and the fifth lens element 450 are adhered together to form a doublet lens. Moreover, the wide-angle imaging lens assembly is provided with a stop 400 and an electronic sensor, the stop 400 is disposed between the third lens element 430 and the fourth lens element 440, the electronic sensor is disposed at the image plane 490 for image formation of an object. The wide-angle imaging lens assembly further comprises an IR-filter 460 disposed between the image-side surface 452 of the fifth lens element 450 and the image plane 490; the IR-filter 460 is made of glass and has no influence on the focal length of the wide-angle imaging lens assembly.

The equation of the aspheric surface profiles of the fourth embodiment has the same form as that of the first embodiment.

In the fourth embodiment of the present wide-angle imaging lens assembly, the focal length of the wide-angle imaging lens assembly is f, and it satisfies the relation: f=2.49 (mm).

In the fourth embodiment of the present wide-angle imaging lens assembly, the f-number of the wide-angle imaging lens assembly is Fno, and it satisfies the relation: Fno=2.80.

In the fourth embodiment of the present wide-angle imaging lens assembly, half of the maximal field of view of the wide-angle imaging lens assembly is HFOV, and it satisfies the relation: HFOV=73.2 deg. In the fourth embodiment of the present wide-angle imaging lens assembly, the Abbe number of the first lens element 410 is V1, the Abbe number of the second lens element 420 is V2, and they satisfy the relation: V1−V2=32.5.

In the fourth embodiment of the present wide-angle imaging lens assembly, the focal length of the first lens element 410 is f1, the focal length of the second lens element 420 is f2, and they satisfy the relation: f1/f2=0.16.

In the fourth embodiment of the present wide-angle imaging lens assembly, the radius of curvature of the image-side surface 442 of the fourth lens element 440 is R8, the radius of curvature of the object-side surface 441 of the fourth lens element 440 is R7, and they satisfy the relation: R8/R7=−0.13.

In the fourth embodiment of the present wide-angle imaging lens assembly, the radius of curvature of the object-side surface 411 of the first lens element 410 is R1, the radius of curvature of the image-side surface 412 of the first lens element 410 is R2, and they satisfy the relation: (R1+R2)/(R1−R2)=0.40.

In the fourth embodiment of the present wide-angle imaging lens assembly, the distance on the optical axis between the second lens element 420 and the third lens element 430 is T23, the distance on the optical axis between the first lens element 410 and the second lens element 420 is T12, and they satisfy the relation: T23/T12=0.30.

In the fourth embodiment of the present wide-angle imaging lens assembly, the thickness of the fourth lens element 440 on the optical axis is CT4, the radius of curvature of the image-side surface 442 of the fourth lens element 440 is R8, and they satisfy the relation: CT4/R8=0.11.

In the fourth embodiment of the present wide-angle imaging lens assembly, the focal length of the wide-angle imaging lens assembly is f, half of the diagonal length of the effective pixel area of the electronic sensor is ImgH, and they satisfy the relation: f/ImgH=0.83.

In the fourth embodiment of the present wide-angle imaging lens assembly, the distance on the optical axis between the stop 400 and the electronic sensor is SL, the distance on the optical axis between the object-side surface 411 of the first lens element 410 and the electronic sensor is TTL, half of the diagonal length of the effective pixel area of the electronic sensor is ImgH, and they satisfy the relations: SL/TTL=0.46, TTL/ImgH=4.63.

The detailed optical data of the fourth embodiment is shown in FIG. 16 (TABLE 7), and the aspheric surface data is shown in FIG. 17 (TABLE 8), wherein the units of the radius of curvature, the thickness and the focal length are expressed in mm, and HFOV is half of the maximal field of view.

Figure 5A:
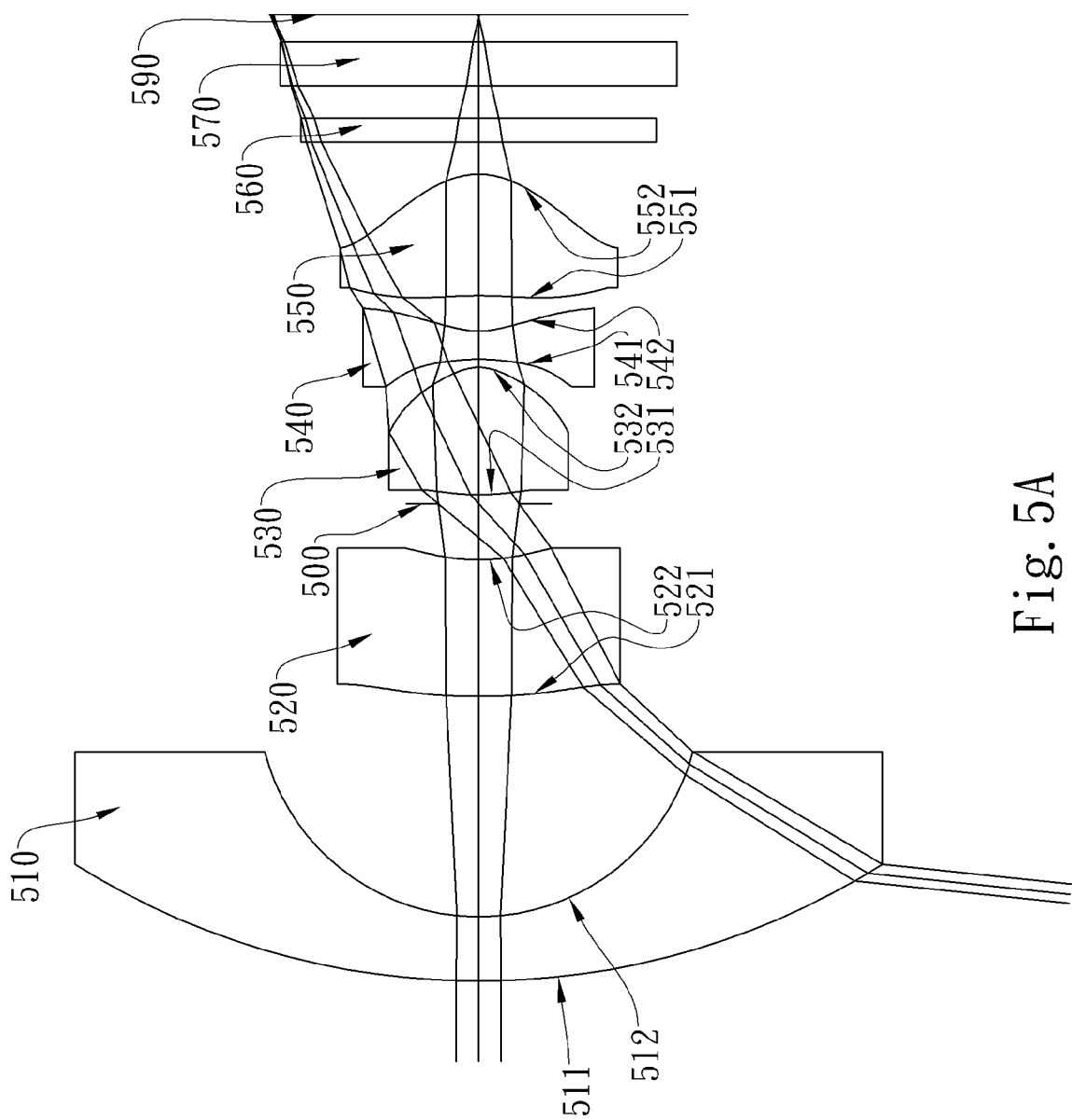
FIG. 5A shows a wide-angle imaging lens assembly in accordance with the fifth embodiment of the present invention.
Figure 5B:
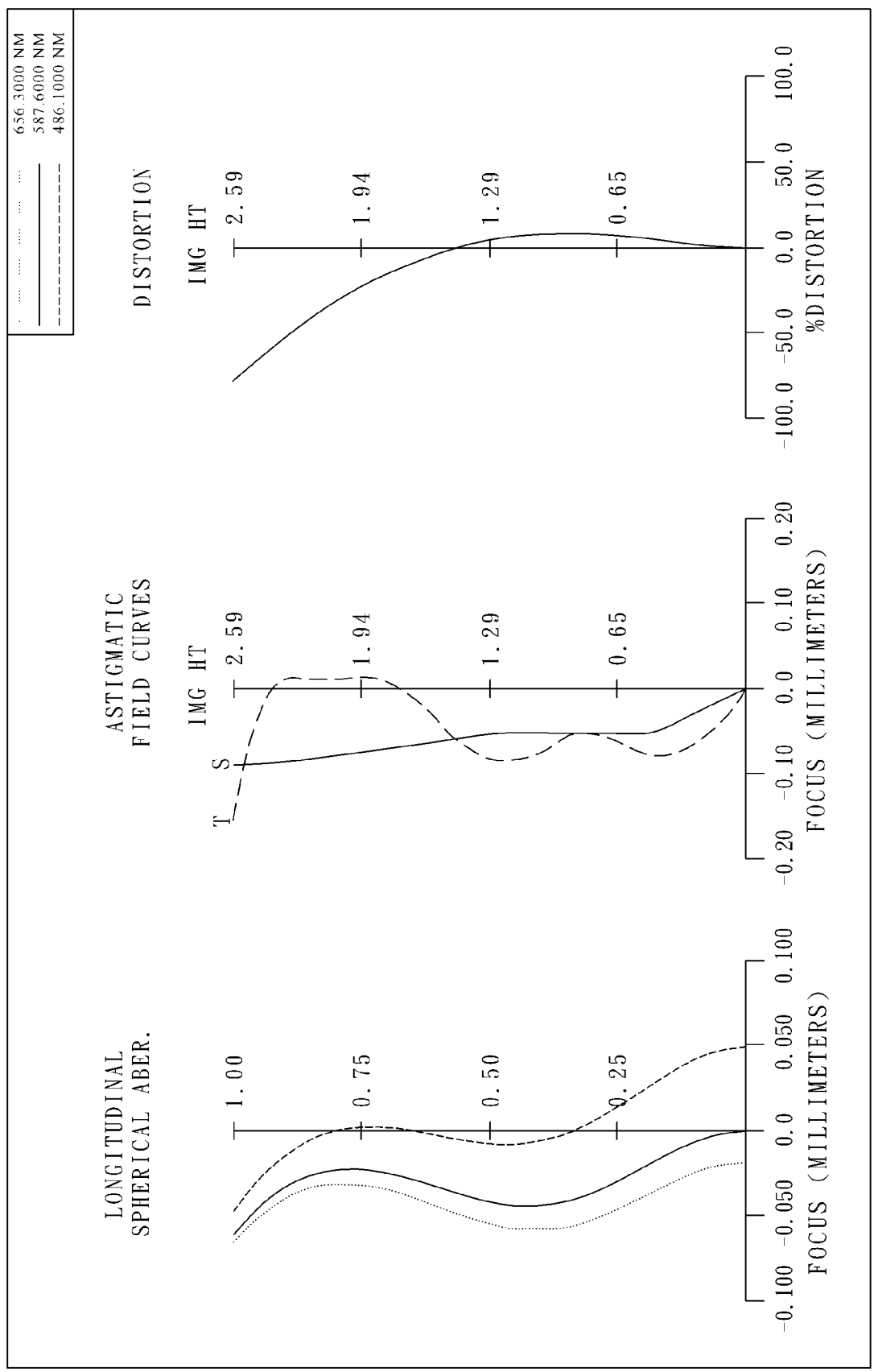
FIG. 5B shows the aberration curves of the fifth embodiment of the present invention.

FIG. 5A shows a wide-angle imaging lens assembly in accordance with the fifth embodiment of the present invention, and FIG. 5B shows the aberration curves of the fifth embodiment of the present invention. In the fifth embodiment of the present invention, there is a wide-angle imaging lens assembly mainly comprising five lens elements, in order from an object side to an image side: a glass first lens element 510 with negative refractive power having a convex object-side surface 511 and a concave image-side surface 512; a plastic second lens element 520 with negative refractive power having a convex object-side surface 521 and a concave image-side surface 522, the object-side and image-side surfaces 521 and 522 thereof being aspheric; a plastic third lens element 530 with positive refractive power having a convex object-side surface 531 and a convex image-side surface 532, the object-side and image-side surfaces 531 and 532 thereof being aspheric; a plastic fourth lens element 540 with negative refractive power having a concave object-side surface 541 and a concave image-side surface 542, the object-side and image-side surfaces 541 and 542 thereof being aspheric; and a plastic fifth lens element 550 with positive refractive power having a concave object-side surface 551 and a convex image-side surface 552, the object-side and image-side surfaces 551 and 552 thereof being aspheric. Moreover, the wide-angle imaging lens assembly is provided with a stop 500 and an electronic sensor, the stop 500 is disposed between the second lens element 520 and the third lens element 530, the electronic sensor is disposed at the image plane 590 for image formation of an object. The wide-angle imaging lens assembly further comprises an IR-filter 560 and a cover-glass 570 sequentially disposed between the image-side surface 552 of the fifth lens element 550 and the image plane 590; the IR-filter 560 and the cover-glass 570 are made of glass and have no influence on the focal length of the wide-angle imaging lens assembly.

The equation of the aspheric surface profiles of the fifth embodiment has the same form as that of the first embodiment.

In the fifth embodiment of the present wide-angle imaging lens assembly, the focal length of the wide-angle imaging lens assembly is f, and it satisfies the relation: f=1.23 (mm).

In the fifth embodiment of the present wide-angle imaging lens assembly, the f-number of the wide-angle imaging lens assembly is Fno, and it satisfies the relation: Fno=2.20.

In the fifth embodiment of the present wide-angle imaging lens assembly, half of the maximal field of view of the wide-angle imaging lens assembly is HFOV, and it satisfies the relation: HFOV=84.0 deg.

In the fifth embodiment of the present wide-angle imaging lens assembly, the Abbe number of the first lens element 510 is V1, the Abbe number of the second lens element 520 is V2, and they satisfy the relation: V1−V2=31.3.

In the fifth embodiment of the present wide-angle imaging lens assembly, the focal length of the first lens element 510 is f1, the focal length of the second lens element 520 is f2, and they satisfy the relation: f1/f2=0.91.

In the fifth embodiment of the present wide-angle imaging lens assembly, the radius of curvature of the image-side surface 542 of the fourth lens element 540 is R8, the radius of curvature of the object-side surface 541 of the fourth lens element 540 is R7, and they satisfy the relation: R8/R7=−0.37.

In the fifth embodiment of the present wide-angle imaging lens assembly, the radius of curvature of the object-side surface 511 of the first lens element 510 is R1, the radius of curvature of the image-side surface 512 of the first lens element 510 is R2, and they satisfy the relation: (R1+R2)/(R1−R2)=1.83.

In the fifth embodiment of the present wide-angle imaging lens assembly, the distance on the optical axis between the second lens element 520 and the third lens element 530 is T23, the distance on the optical axis between the first lens element 510 and the second lens element 520 is T12, and they satisfy the relation: T23/T12=0.29.

In the fifth embodiment of the present wide-angle imaging lens assembly, the thickness of the fourth lens element 540 on the optical axis is CT4, the radius of curvature of the image-side surface 542 of the fourth lens element 540 is R8, and they satisfy the relation: CT4/R8=0.39.

In the fifth embodiment of the present wide-angle imaging lens assembly, the focal length of the wide-angle imaging lens assembly is f, half of the diagonal length of the effective pixel area of the electronic sensor is ImgH, and they satisfy the relation: f/ImgH=0.47.

In the fifth embodiment of the present wide-angle imaging lens assembly, the distance on the optical axis between the stop 500 and the electronic sensor is SL, the distance on the optical axis between the object-side surface 511 of the first lens element 510 and the electronic sensor is TTL, half of the diagonal length of the effective pixel area of the electronic sensor is ImgH, and they satisfy the relations: SL/TTL=0.49, TTL/ImgH=4.53.

The detailed optical data of the fifth embodiment is shown in FIG. 18 (TABLE 9), and the aspheric surface data is shown in FIG. 19 (TABLE 10), wherein the units of the radius of curvature, the thickness and the focal length are expressed in mm, and HFOV is half of the maximal field of view.

Figure 6A:
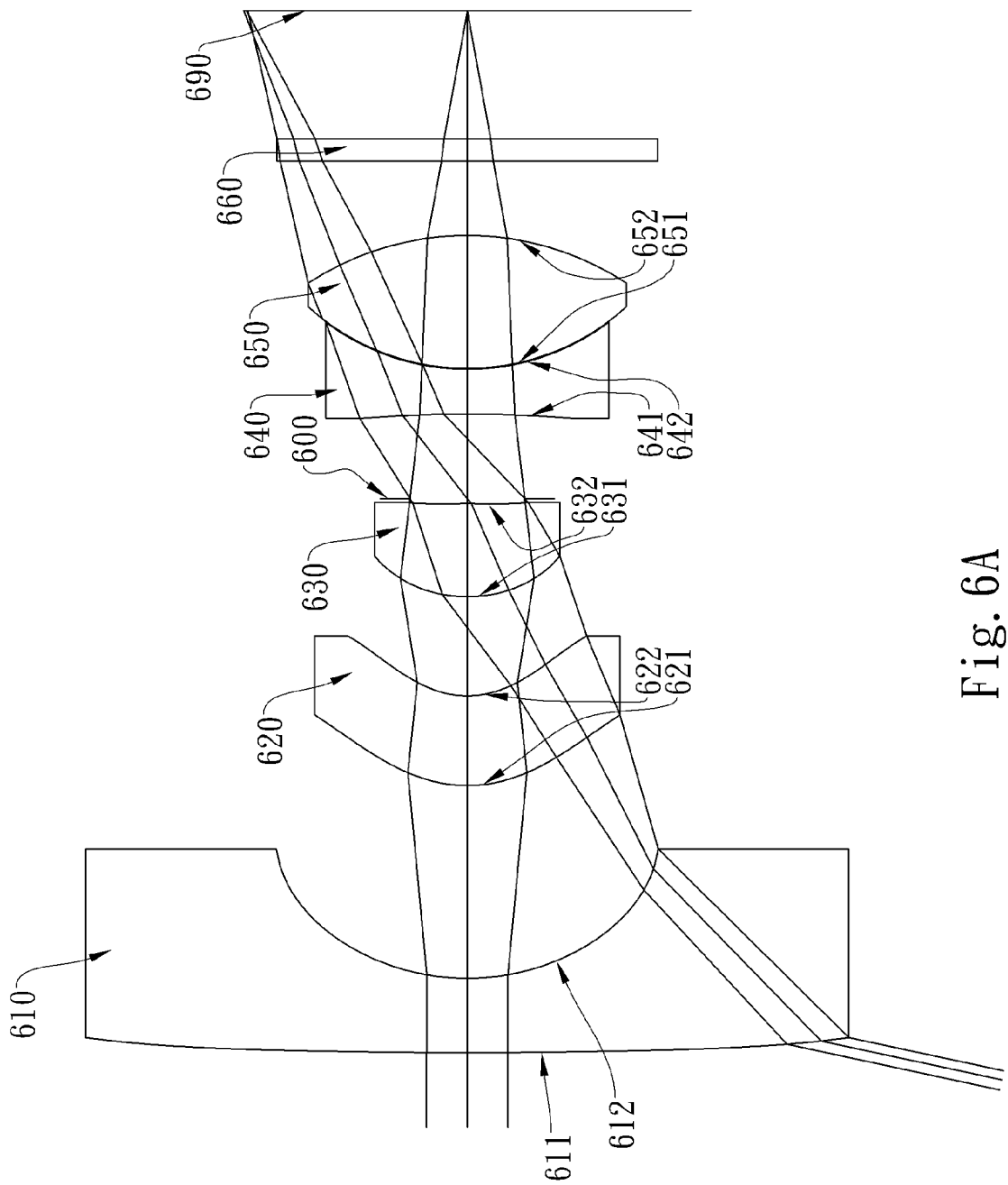
FIG. 6A shows a wide-angle imaging lens assembly in accordance with the sixth embodiment of the present invention.
Figure 6B:
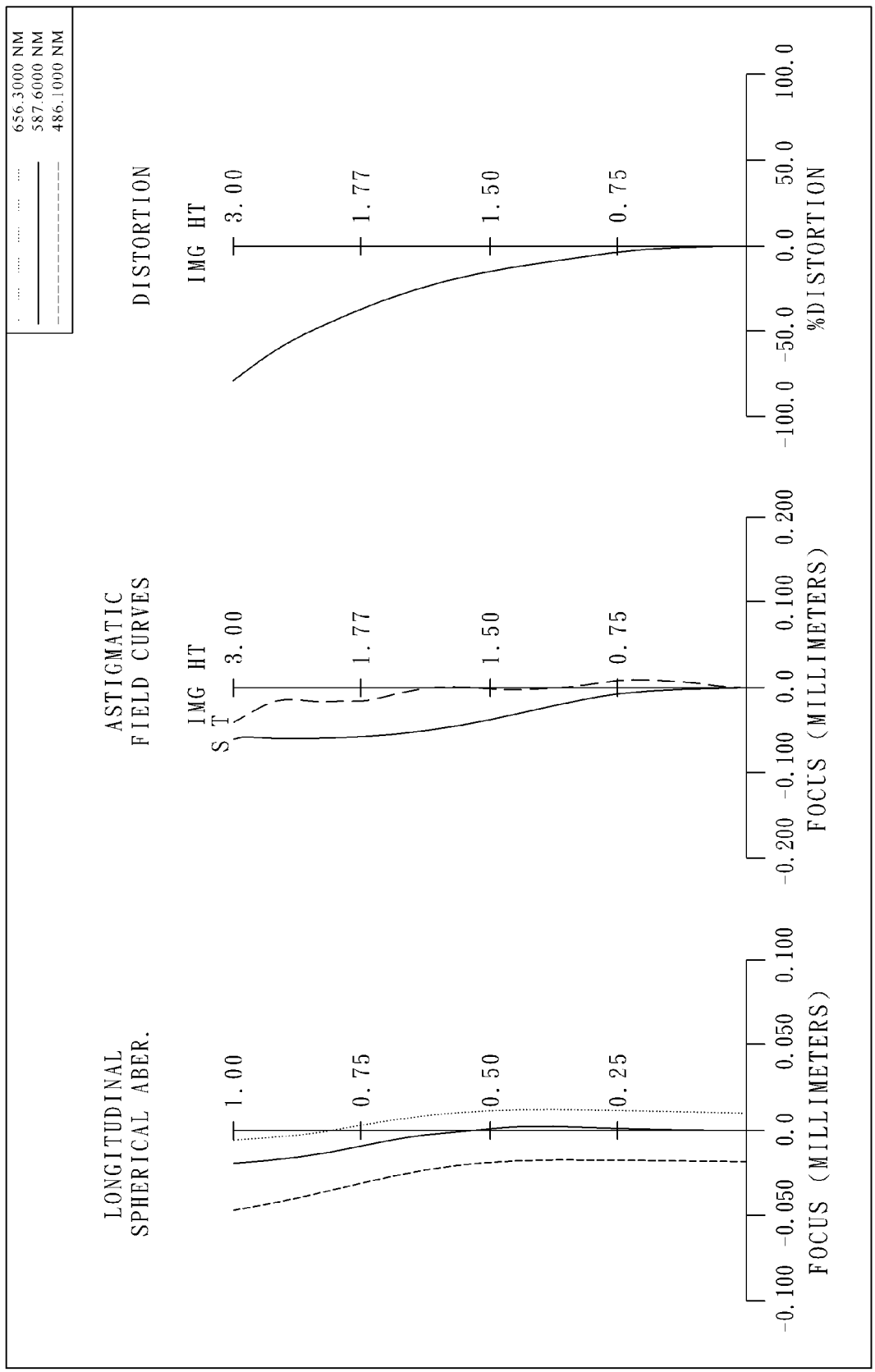
FIG. 6B shows the aberration curves of the sixth embodiment of the present invention.

FIG. 6A shows a wide-angle imaging lens assembly in accordance with the sixth embodiment of the present invention, and FIG. 6B shows the aberration curves of the sixth embodiment of the present invention. In the sixth embodiment of the present invention, there is a wide-angle imaging lens assembly mainly comprising five lens elements, in order from an object side to an image side: a plastic first lens element 610 with negative refractive power having a convex object-side surface 611 and a concave image-side surface 612, the object-side and image-side surfaces 611 and 612 thereof being aspheric; a plastic second lens element 620 with negative refractive power having a convex object-side surface 621 and a concave image-side surface 622, the object-side and image-side surfaces 621 and 622 thereof being aspheric; a plastic third lens element 630 with positive refractive power having a convex object-side surface 631 and a convex image-side surface 632, the object-side and image-side surfaces 631 and 632 thereof being aspheric; a glass fourth lens element 640 with negative refractive power having a concave object-side surface 641 and a concave image-side surface 642; and a glass fifth lens element 650 with positive refractive power having a convex object-side surface 651 and a convex image-side surface 652; wherein the fourth lens element 640 and the fifth lens element 650 are adhered together to form a doublet lens. Moreover, the wide-angle imaging lens assembly is provided with a stop 600 and an electronic sensor, the stop 600 is disposed between the third lens element 630 and the fourth lens element 640, the electronic sensor is disposed at the image plane 690 for image formation of an object. The wide-angle imaging lens assembly further comprises an IR-filter 660 disposed between the image-side surface 652 of the fifth lens element 650 and the image plane 690; the IR-filter 660 is made of glass and has no influence on the focal length of the wide-angle imaging lens assembly.

The equation of the aspheric surface profiles of the sixth embodiment has the same form as that of the first embodiment.

In the sixth embodiment of the present wide-angle imaging lens assembly, the focal length of the wide-angle imaging lens assembly is f, and it satisfies the relation: f=3.06 (mm).

In the sixth embodiment of the present wide-angle imaging lens assembly, the f-number of the wide-angle imaging lens assembly is Fno, and it satisfies the relation: Fno=2.80.

In the sixth embodiment of the present wide-angle imaging lens assembly, half of the maximal field of view of the wide-angle imaging lens assembly is HFOV, and it satisfies the relation: HFOV=77.8 deg.

In the sixth embodiment of the present wide-angle imaging lens assembly, the Abbe number of the first lens element 610 is V1, the Abbe number of the second lens element 620 is V2, and they satisfy the relation: V1−V2=30.2.

In the sixth embodiment of the present wide-angle imaging lens assembly, the focal length of the first lens element 610 is f1, the focal length of the second lens element 620 is f2, and they satisfy the relation: f1/f2=0.25.

In the sixth embodiment of the present wide-angle imaging lens assembly, the radius of curvature of the image-side surface 642 of the fourth lens element 640 is R8, the radius of curvature of the object-side surface 641 of the fourth lens element 640 is R7, and they satisfy the relation: R8/R7=−0.18.

In the sixth embodiment of the present wide-angle imaging lens assembly, the radius of curvature of the object-side surface 611 of the first lens element 610 is R1, the radius of curvature of the image-side surface 612 of the first lens element 610 is R2, and they satisfy the relation: (R1+R2)/(R1−R2)=1.08.

In the sixth embodiment of the present wide-angle imaging lens assembly, the distance on the optical axis between the second lens element 620 and the third lens element 630 is T23, the distance on the optical axis between the first lens element 610 and the second lens element 620 is T12, and they satisfy the relation: T23/T12=0.51.

In the sixth embodiment of the present wide-angle imaging lens assembly, the thickness of the fourth lens element 640 on the optical axis is CT4, the radius of curvature of the image-side surface 642 of the fourth lens element 640 is R8, and they satisfy the relation: CT4/R8=0.19.

In the sixth embodiment of the present wide-angle imaging lens assembly, the focal length of the wide-angle imaging lens assembly is f, half of the diagonal length of the effective pixel area of the electronic sensor is ImgH, and they satisfy the relation: f/ImgH=1.02.

In the sixth embodiment of the present wide-angle imaging lens assembly, the distance on the optical axis between the stop 600 and the electronic sensor is SL, the distance on the optical axis between the object-side surface 611 of the first lens element 610 and the electronic sensor is TTL, half of the diagonal length of the effective pixel area of the electronic sensor is ImgH, and they satisfy the relations: SL/TTL=0.46, TTL/ImgH=4.63.

The detailed optical data of the sixth embodiment is shown in FIG. 20 (TABLE 11), and the aspheric surface data is shown in FIG. 21 (TABLE 12), wherein the units of the radius of curvature, the thickness and the focal length are expressed in mm, and HFOV is half of the maximal field of view.

Figure 7A:
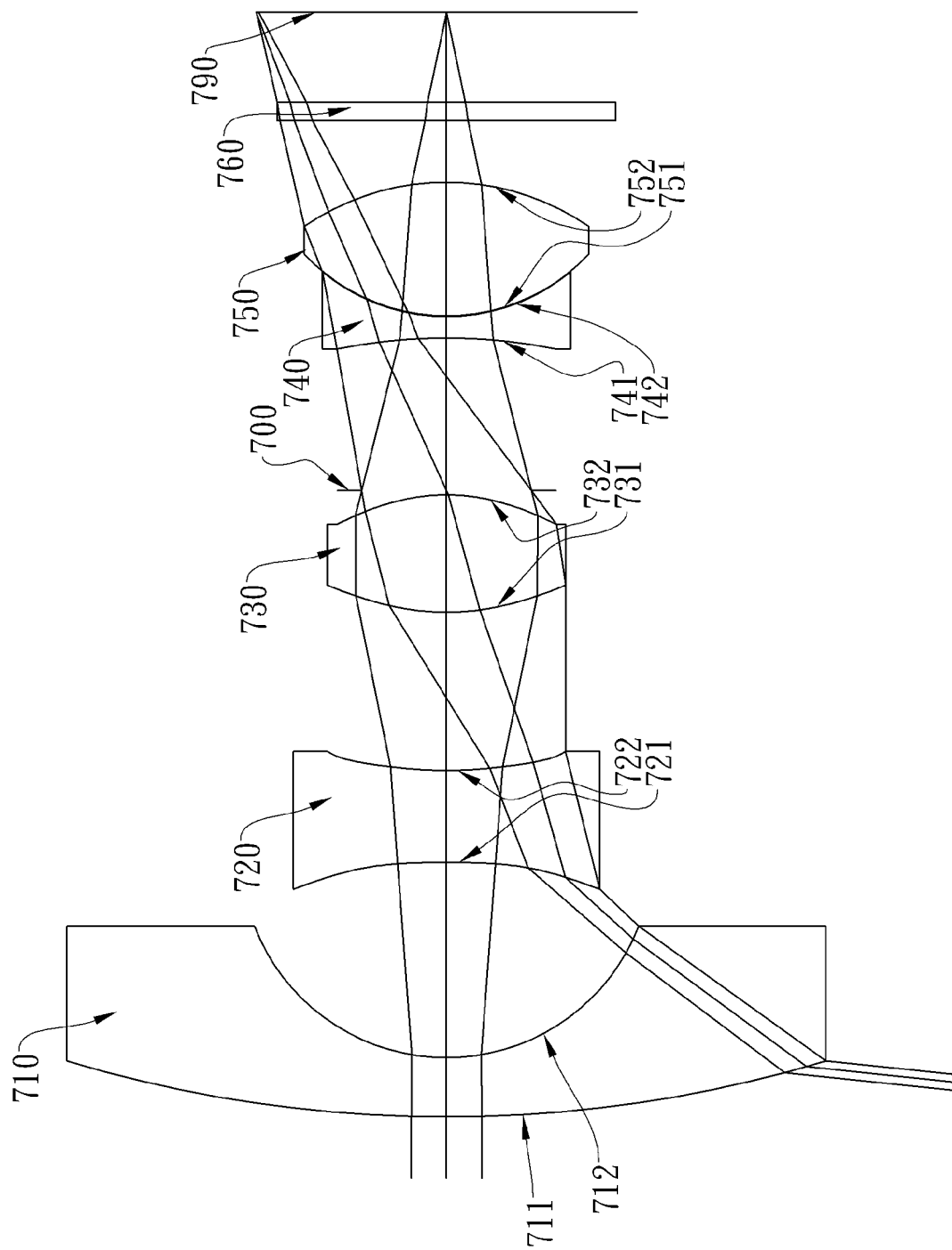
FIG. 7A shows a wide-angle imaging lens assembly in accordance with the seventh embodiment of the present invention.
Figure 7B:
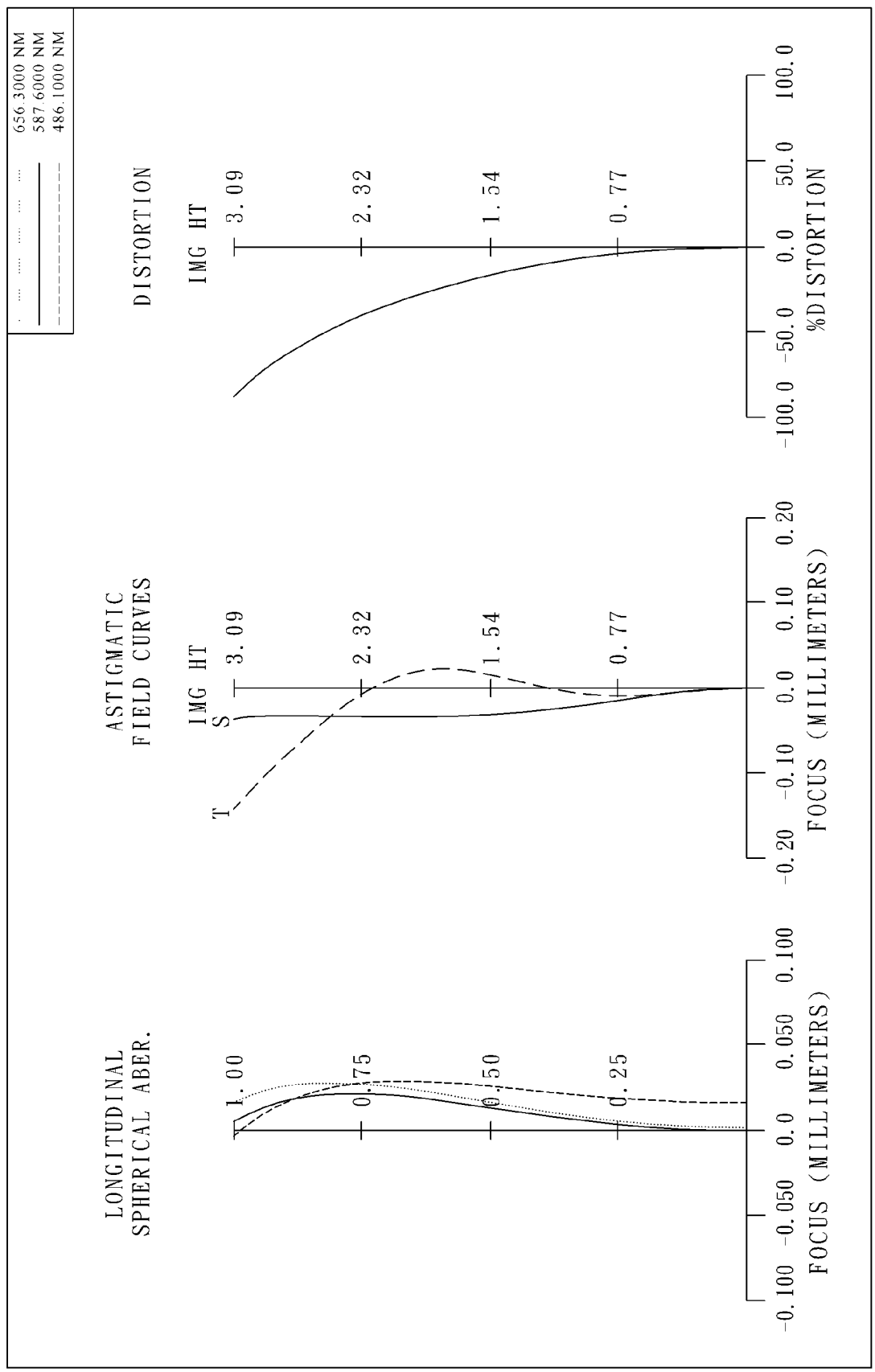
FIG. 7B shows the aberration curves of the seventh embodiment of the present invention.

FIG. 7A shows a wide-angle imaging lens assembly in accordance with the seventh embodiment of the present invention, and FIG. 7B shows the aberration curves of the seventh embodiment of the present invention. In the seventh embodiment of the present invention, there is a wide-angle imaging lens assembly mainly comprising five lens elements, in order from an object side to an image side: a glass first lens element 710 with negative refractive power having a convex object-side surface 711 and a concave image-side surface 712; a plastic second lens element 720 with negative refractive power having a concave object-side surface 721 and a concave image-side surface 722, the object-side and image-side surfaces 721 and 722 thereof being aspheric; a plastic third lens element 730 with positive refractive power having a convex object-side surface 731 and a convex image-side surface 732, the object-side and image-side surfaces 731 and 732 thereof being aspheric; a glass fourth lens element 740 with negative refractive power having a concave object-side surface 741 and a concave image-side surface 742; and a glass fifth lens element 750 with positive refractive power having a convex object-side surface 751 and a convex image-side surface 752; wherein the fourth lens element 740 and the fifth lens element 750 are adhered together to form a doublet lens. Moreover, the wide-angle imaging lens assembly is provided with a stop 700 and an electronic sensor, the stop 700 is disposed between the third lens element 730 and the fourth lens element 740, the electronic sensor is disposed at the image plane 790 for image formation of an object. The wide-angle imaging lens assembly further comprises an IR-filter 760 disposed between the image-side surface 752 of the fifth lens element 750 and the image plane 790; the IR-filter 760 is made of glass and has no influence on the focal length of the wide-angle imaging lens assembly.

The equation of the aspheric surface profiles of the seventh embodiment has the same form as that of the first embodiment.

In the seventh embodiment of the present wide-angle imaging lens assembly, the focal length of the wide-angle imaging lens assembly is f, and it satisfies the relation: f=2.75 (mm).

In the seventh embodiment of the present wide-angle imaging lens assembly, the f-number of the wide-angle imaging lens assembly is Fno, and it satisfies the relation: Fno=2.40.

In the seventh embodiment of the present wide-angle imaging lens assembly, half of the maximal field of view of the wide-angle imaging lens assembly is HFOV, and it satisfies the relation: HFOV=84.0 deg.

In the seventh embodiment of the present wide-angle imaging lens assembly, the Abbe number of the first lens element 710 is V1, the Abbe number of the second lens element 720 is V2, and they satisfy the relation: V1−V2=42.7.

In the seventh embodiment of the present wide-angle imaging lens assembly, the focal length of the first lens element 710 is f1, the focal length of the second lens element 720 is f2, and they satisfy the relation: f1/f2=1.13.

In the seventh embodiment of the present wide-angle imaging lens assembly, the radius of curvature of the image-side surface 742 of the fourth lens element 740 is R8, the radius of curvature of the object-side surface 741 of the fourth lens element 740 is R7, and they satisfy the relation: R8/R7=−0.35.

In the seventh embodiment of the present wide-angle imaging lens assembly, the radius of curvature of the object-side surface 711 of the first lens element 710 is R1, the radius of curvature of the image-side surface 712 of the first lens element 710 is R2, and they satisfy the relation: (R1+R2)/(R1−R2)=1.37.

In the seventh embodiment of the present wide-angle imaging lens assembly, the distance on the optical axis between the second lens element 720 and the third lens element 730 is T23, the distance on the optical axis between the first lens element 710 and the second lens element 720 is T12, and they satisfy the relation: T23/T12=0.81.

In the seventh embodiment of the present wide-angle imaging lens assembly, the thickness of the fourth lens element 740 on the optical axis is CT4, the radius of curvature of the image-side surface 742 of the fourth lens element 740 is R8, and they satisfy the relation: CT4/R8=0.11.

In the seventh embodiment of the present wide-angle imaging lens assembly, the focal length of the wide-angle imaging lens assembly is f, half of the diagonal length of the effective pixel area of the electronic sensor is ImgH, and they satisfy the relation: f/ImgH=0.89.

In the seventh embodiment of the present wide-angle imaging lens assembly, the distance on the optical axis between the stop 700 and the electronic sensor is SL, the distance on the optical axis between the object-side surface 711 of the first lens element 710 and the electronic sensor is TTL, half of the diagonal length of the effective pixel area of the electronic sensor is ImgH, and they satisfy the relations: SL/TTL=0.43, TTL/ImgH=5.77.

The detailed optical data of the seventh embodiment is shown in FIG. 22 (TABLE 13), and the aspheric surface data is shown in FIG. 23 (TABLE 14), wherein the units of the radius of curvature, the thickness and the focal length are expressed in mm, and HFOV is half of the maximal field of view.

Figure 8A:
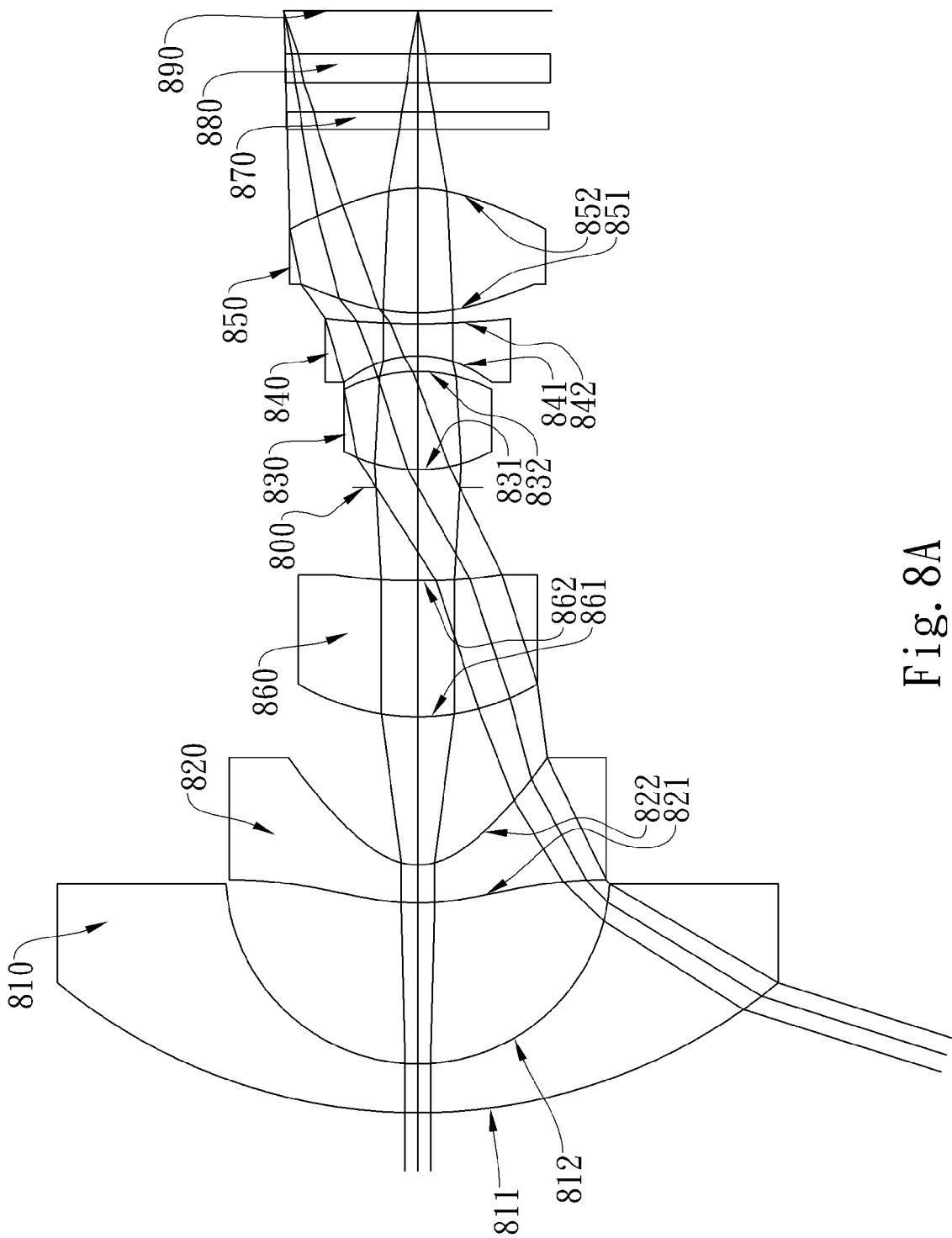
FIG. 8A shows a wide-angle imaging lens assembly in accordance with the eighth embodiment of the present invention.
Figure 8B:
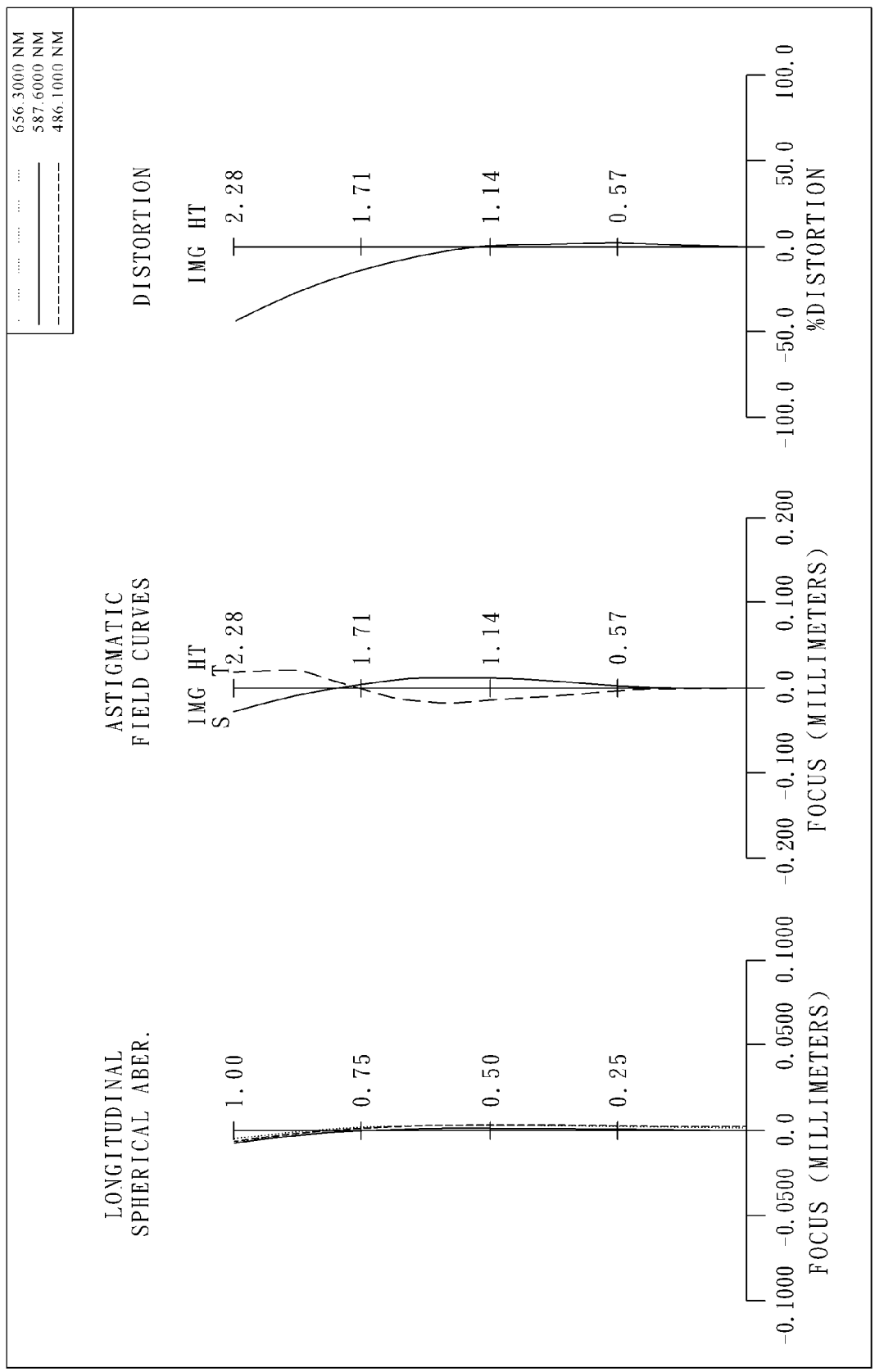
FIG. 8B shows the aberration curves of the eighth embodiment of the present invention.

FIG. 8A shows a wide-angle imaging lens assembly in accordance with the eighth embodiment of the present invention, and FIG. 8B shows the aberration curves of the eighth embodiment of the present invention. In the eighth embodiment of the present invention, there is a wide-angle imaging lens assembly mainly comprising six lens elements, in order from an object side to an image side: a glass first lens element 810 with negative refractive power having a convex object-side surface 811 and a concave image-side surface 812; a plastic second lens element 820 with negative refractive power having a convex object-side surface 821 and a concave image-side surface 822, the object-side and image-side surfaces 821 and 822 thereof being aspheric; a glass third lens element 830 with positive refractive power having a convex object-side surface 831 and a convex image-side surface 832; a plastic fourth lens element 840 with negative refractive power having a concave object-side surface 841 and a concave image-side surface 842, the object-side and image-side surfaces 841 and 842 thereof being aspheric; a plastic fifth lens element 850 with positive refractive power having a convex object-side surface 851 and a convex image-side surface 852, the object-side and image-side surfaces 851 and 852 thereof being aspheric; and a glass sixth lens element 860 with positive refractive power having a convex object-side surface 861 and a concave image-side surface 862, the sixth lens element 860 being disposed between the second lens element 820 and the third lens element 830. Moreover, the wide-angle imaging lens assembly is provided with a stop 800 and an electronic sensor, the stop 800 is disposed between the sixth lens element 860 and the third lens element 830, the electronic sensor is disposed at the image plane 890 for image formation of an object. The wide-angle imaging lens assembly further comprises an IR-filter 870 and a cover-glass 880 sequentially disposed between the image-side surface 852 of the fifth lens element 850 and the image plane 890; the IR-filter 870 and the cover-glass 880 are made of glass and have no influence on the focal length of the wide-angle imaging lens assembly.

The equation of the aspheric surface profiles of the eighth embodiment has the same form as that of the first embodiment.

In the eighth embodiment of the present wide-angle imaging lens assembly, the focal length of the wide-angle imaging lens assembly is f, and it satisfies the relation: f=1.27 (mm).

In the eighth embodiment of the present wide-angle imaging lens assembly, the f-number of the wide-angle imaging lens assembly is Fno, and it satisfies the relation: Fno=2.82.

In the eighth embodiment of the present wide-angle imaging lens assembly, half of the maximal field of view of the wide-angle imaging lens assembly is HFOV, and it satisfies the relation: HFOV=72.4 deg.

In the eighth embodiment of the present wide-angle imaging lens assembly, the Abbe number of the first lens element 810 is V1, the Abbe number of the second lens element 820 is V2, and they satisfy the relation: V1−V2=4.5.

In the eighth embodiment of the present wide-angle imaging lens assembly, the focal length of the first lens element 810 is f1, the focal length of the second lens element 820 is f2, and they satisfy the relation: f1/f2=3.02.

In the eighth embodiment of the present wide-angle imaging lens assembly, the radius of curvature of the image-side surface 842 of the fourth lens element 840 is R8, the radius of curvature of the object-side surface 841 of the fourth lens element 840 is R7, and they satisfy the relation: R8/R7=−3.92.

In the eighth embodiment of the present wide-angle imaging lens assembly, the radius of curvature of the object-side surface 811 of the first lens element 810 is R1, the radius of curvature of the image-side surface 812 of the first lens element 810 is R2, and they satisfy the relation: (R1+R2)/(R1−R2)=2.03.

In the eighth embodiment of the present wide-angle imaging lens assembly, the distance on the optical axis between the second lens element 820 and the third lens element 830 is T23, the distance on the optical axis between the first lens element 810 and the second lens element 820 is T12, and they satisfy the relation: T23/T12=2.45.

In the eighth embodiment of the present wide-angle imaging lens assembly, the thickness of the fourth lens element 840 on the optical axis is CT4, the radius of curvature of the image-side surface 842 of the fourth lens element 840 is R8, and they satisfy the relation: CT4/R8=0.07.

In the eighth embodiment of the present wide-angle imaging lens assembly, the focal length of the wide-angle imaging lens assembly is f, half of the diagonal length of the effective pixel area of the electronic sensor is ImgH, and they satisfy the relation: f/ImgH=0.56.

In the eighth embodiment of the present wide-angle imaging lens assembly, the distance on the optical axis between the stop 800 and the electronic sensor is SL, the distance on the optical axis between the object-side surface 811 of the first lens element 810 and the electronic sensor is TTL, half of the diagonal length of the effective pixel area of the electronic sensor is ImgH, and they satisfy the relations: SL/TTL=0.42, TTL/ImgH=8.14.

The detailed optical data of the eighth embodiment is shown in FIG. 24 (TABLE 15), and the aspheric surface data is shown in FIG. 25 (TABLE 16), wherein the units of the radius of curvature, the thickness and the focal length are expressed in mm, and HFOV is half of the maximal field of view.

Figure 9A:
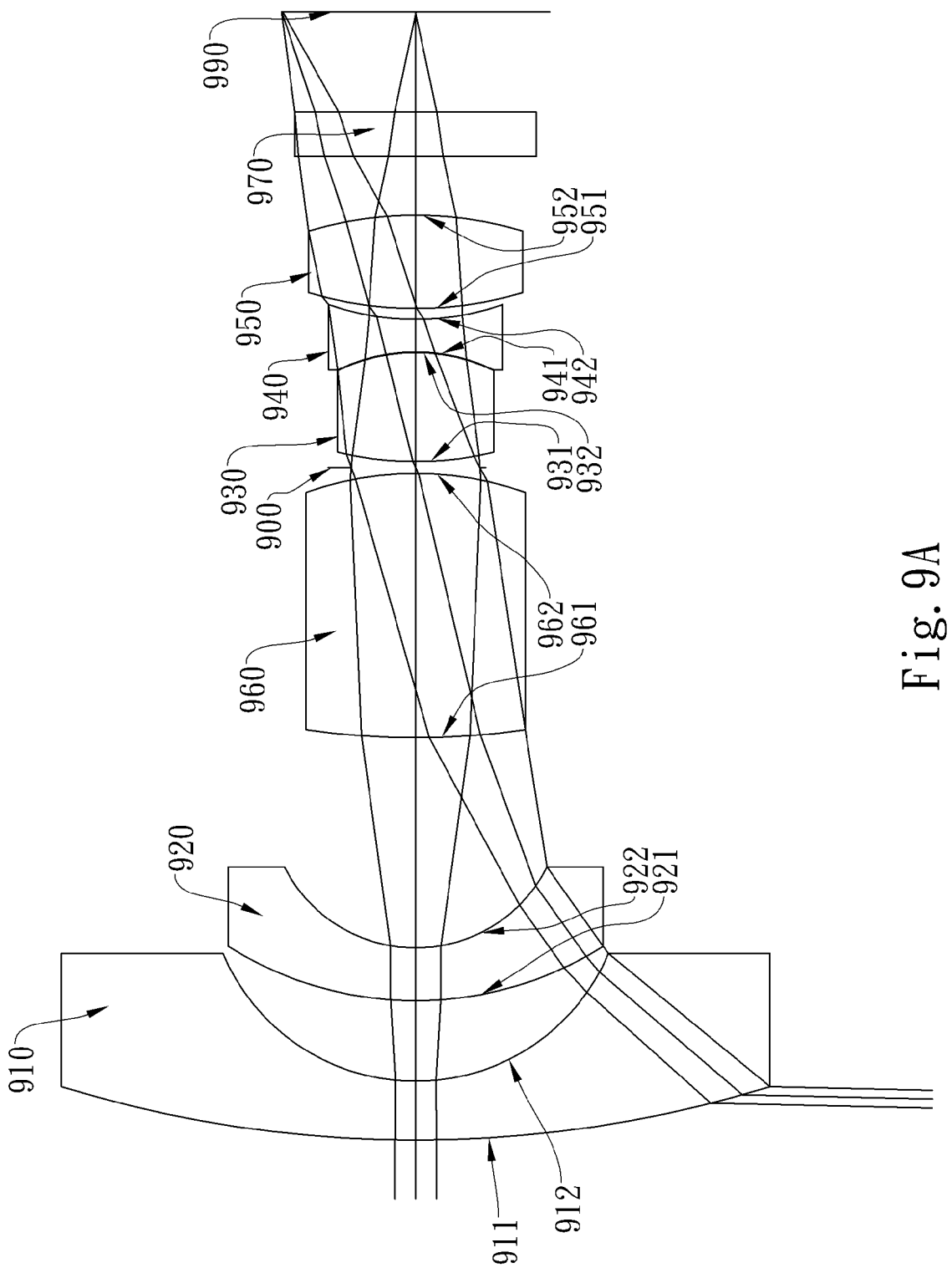
FIG. 9A shows a wide-angle imaging lens assembly in accordance with the ninth embodiment of the present invention.
Figure 9B:
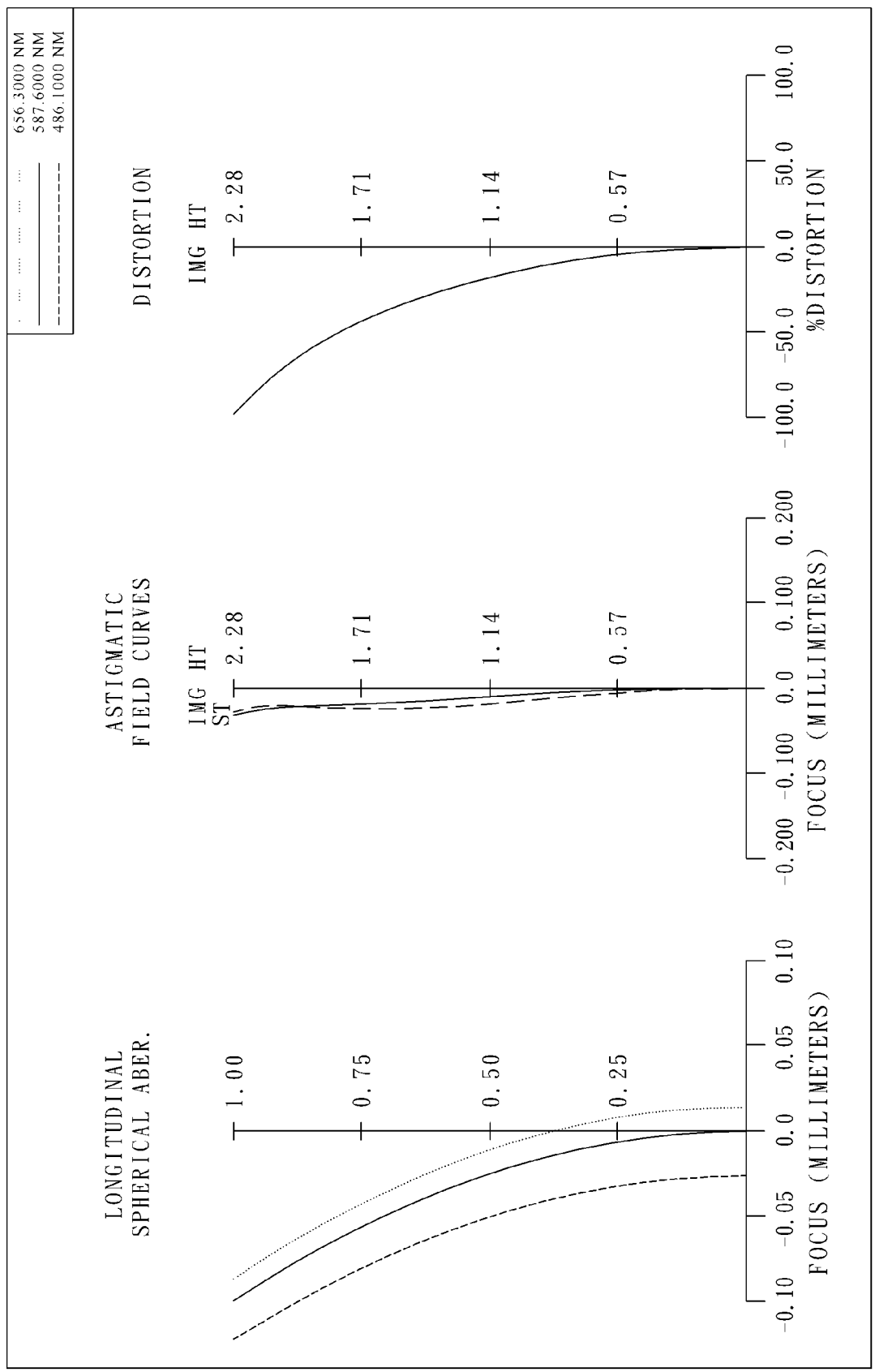
FIG. 9B shows the aberration curves of the ninth embodiment of the present invention.

FIG. 9A shows a wide-angle imaging lens assembly in accordance with the ninth embodiment of the present invention, and FIG. 9B shows the aberration curves of the ninth embodiment of the present invention. In the ninth embodiment of the present invention, there is a wide-angle imaging lens assembly mainly comprising six lens elements, in order from an object side to an image side: a glass first lens element 910 with negative refractive power having a convex object-side surface 911 and a concave image-side surface 912; a glass second lens element 920 with negative refractive power having a convex object-side surface 921 and a concave image-side surface 922; a glass third lens element 930 with positive refractive power having a convex object-side surface 931 and a convex image-side surface 932; a glass fourth lens element 940 with negative refractive power having a concave object-side surface 941 and a concave image-side surface 942; a glass fifth lens element 950 with positive refractive power having a convex object-side surface 951 and a convex image-side surface 952; and a glass sixth lens element 960 with positive refractive power having a convex object-side surface 961 and a convex image-side surface 962, the sixth lens element 960 being disposed between the second lens element 920 and the third lens element 930. Moreover, the wide-angle imaging lens assembly is provided with a stop 900 and an electronic sensor, the stop 900 is disposed between the sixth lens element 960 and the third lens element 930, the electronic sensor is disposed at the image plane 990 for image formation of an object. The wide-angle imaging lens assembly further comprises an IR-filter 970 disposed between the image-side surface 952 of the fifth lens element 950 and the image plane 990; the IR-filter 970 is made of glass and has no influence on the focal length of the wide-angle imaging lens assembly.

In the ninth embodiment of the present wide-angle imaging lens assembly, the focal length of the wide-angle imaging lens assembly is f, and it satisfies the relation: f=1.70 (mm).

In the ninth embodiment of the present wide-angle imaging lens assembly, the f-number of the wide-angle imaging lens assembly is Fno, and it satisfies the relation: Fno=2.40.

In the ninth embodiment of the present wide-angle imaging lens assembly, half of the maximal field of view of the wide-angle imaging lens assembly is HFOV, and it satisfies the relation: HFOV=88.7 deg.

In the ninth embodiment of the present wide-angle imaging lens assembly, the Abbe number of the first lens element 910 is V1, the Abbe number of the second lens element 920 is V2, and they satisfy the relation: V1−V2=0.0.

In the ninth embodiment of the present wide-angle imaging lens assembly, the focal length of the first lens element 910 is f1, the focal length of the second lens element 920 is f2, and they satisfy the relation: f1/f2=0.91.

In the ninth embodiment of the present wide-angle imaging lens assembly, the radius of curvature of the image-side surface 942 of the fourth lens element 940 is R8, the radius of curvature of the object-side surface 941 of the fourth lens element 940 is R7, and they satisfy the relation: R8/R7=−1.46.

In the ninth embodiment of the present wide-angle imaging lens assembly, the radius of curvature of the object-side surface 911 of the first lens element 910 is R1, the radius of curvature of the image-side surface 912 of the first lens element 910 is R2, and they satisfy the relation: (R1+R2)/(R1−R2)=1.42.

In the ninth embodiment of the present wide-angle imaging lens assembly, the distance on the optical axis between the second lens element 920 and the third lens element 930 is T23, the distance on the optical axis between the first lens element 910 and the second lens element 920 is T12, and they satisfy the relation: T23/T12=6.03.

In the ninth embodiment of the present wide-angle imaging lens assembly, the thickness of the fourth lens element 940 on the optical axis is CT4, the radius of curvature of the image-side surface 942 of the fourth lens element 940 is R8, and they satisfy the relation: CT4/R8=0.12.

In the ninth embodiment of the present wide-angle imaging lens assembly, the focal length of the wide-angle imaging lens assembly is f, half of the diagonal length of the effective pixel area of the electronic sensor is ImgH, and they satisfy the relation: f/ImgH=0.75.

In the ninth embodiment of the present wide-angle imaging lens assembly, the distance on the optical axis between the stop 900 and the electronic sensor is SL, the distance on the optical axis between the object-side surface 911 of the first lens element 910 and the electronic sensor is TTL, half of the diagonal length of the effective pixel area of the electronic sensor is ImgH, and they satisfy the relations: SL/TTL=0.40, TTL/ImgH=8.31.

The detailed optical data of the ninth embodiment is shown in FIG. 26 (TABLE 17), wherein the units of the radius of curvature, the thickness and the focal length are expressed in mm, and HFOV is half of the maximal field of view.

It is to be noted that TABLES 1-17 (illustrated in FIGS. 10-26 respectively) show different data of the different embodiments; however, the data of the different embodiments are obtained from experiments. Therefore, any wide-angle imaging lens assembly of the same structure is considered to be within the scope of the present invention even if it uses different data. The embodiments depicted above and the appended drawings are exemplary and are not intended to limit the claim scope of the present invention. TABLE 18 (illustrated in FIG. 27) shows the data of the respective embodiments resulting from the equations.

What is claimed is:

1. A wide-angle imaging lens assembly comprising, in order from an object-side to an image-side:
   a first lens element with negative refractive power having a convex object-side surface and a concave image-side surface;
   a second lens element with negative refractive power having a convex object-side surface and a concave image-side surface;
   a third lens element with positive refractive power;
   a fourth lens element with negative refractive power having a concave image-side surface; and
   a fifth lens element with positive refractive power; wherein the number of lens elements with refractive power is five; wherein the wide-angle imaging lens assembly is further provided with an electronic sensor for image formation of an object; and wherein a focal length of the first lens element is f1, a focal length of the second lens element is f2, a distance on an optical axis between the second lens element and the third lens element is T23, a distance on the optical axis between the first lens element and the second lens element is T12, a radius of curvature of the image-side surface of the fourth lens element is R8, a radius of curvature of an object-side surface of the fourth lens element is R7, a focal length of the wide-angle imaging lens assembly is f, half of a diagonal length of an effective pixel area of the electronic sensor is ImgH, and they satisfy the relations: 0<f1/f2<2.00, 0.15<T23/T12<0.69, −1.40<R8/R7<0.70, 0.40<f/ImgH<1.10.

2. The wide-angle imaging lens assembly according to claim 1, wherein the fifth lens element has a convex object-side surface and a convex image-side surface.

3. The wide-angle imaging lens assembly according to claim 1, wherein a radius of curvature of the object-side surface of the first lens element is R1, a radius of curvature of the image-side surface of the first lens element is R2, and they satisfy the relation: 1.03<(R1+R2)/(R1−R2)<3.00.

4. The wide-angle imaging lens assembly according to claim 3, wherein the second lens element is made of plastic material and having at least one of the surfaces thereof being aspheric.

5. The wide-angle imaging lens assembly according to claim 3, wherein the focal length of the first lens element is f1, the focal length of the second lens element is f2, and they satisfy the relation: $0<f1/f2<1.20$.

6. The wide-angle imaging lens assembly according to claim 3 further comprising a stop disposed between the second lens element and the fourth lens element, wherein a distance on the optical axis between the stop and the electronic sensor is SL, a distance on the optical axis between the object-side surface of the first lens element and the electronic sensor is TTL, and they satisfy the relation: $0.30<SL/TTL<0.65$.

7. The wide-angle imaging lens assembly according to claim 1 comprising at least one lens element having at least one aspheric surface.

8. The wide-angle imaging lens assembly according to claim 7, wherein an Abbe number of the first lens element is V1, an Abbe number of the second lens element is V2, and they satisfy the relation: $20<V1-V2<50$.

9. The wide-angle imaging lens assembly according to claim 1, wherein the fourth lens element has a concave object-side surface.

10. The wide-angle imaging lens assembly according to claim 1, wherein the fourth lens element and the fifth lens element are adhered together to form a doublet lens element.

11. The wide-angle imaging lens assembly according to claim 1, wherein the distance on the optical axis between the object-side surface of the first lens element and the electronic sensor is TTL, half of the diagonal length of the effective pixel area of the electronic sensor is ImgH, and they satisfy the relation: $TTL/ImgH<8.6$.

12. The wide-angle imaging lens assembly according to claim 11, wherein the distance on the optical axis between the object-side surface of the first lens element and the electronic sensor is TTL, half of the diagonal length of the effective pixel area of the electronic sensor is ImgH, and they satisfy the relation: $TTL/ImgH<6.0$.

13. A wide-angle imaging lens assembly comprising, in order from an object-side to an image-side:
   a first lens element with negative refractive power having a concave image-side surface;
   a second lens element with negative refractive power having a concave image-side surface;
   a third lens element with positive refractive power;
   a fourth lens element with negative refractive power; and
   a fifth lens element with positive refractive power; wherein the wide-angle imaging lens assembly is further provided with a stop and an electronic sensor, the stop is disposed between the second lens element and the fourth lens element, the electronic sensor is disposed at an image plane for image formation of an object; wherein the number of lens elements with refractive power is five; and wherein a focal length of the first lens element is f1, a focal length of the second lens element is f2, a distance on an optical axis between the stop and the electronic sensor is SL, a distance on the optical axis between an object-side surface of the first lens element and the electronic sensor is TTL, half of a diagonal length of an effective pixel area of the electronic sensor is ImgH, a focal length of the wide-angle imaging lens assembly is f, and they satisfy the relations: $0<f1/f2<1.20$, $0.20<SL/TTL<0.85$, $TTL/ImgH<8.6$, $0.40<f/ImgH<1.10$.

14. The wide-angle imaging lens assembly according to claim 13, wherein a radius of curvature of the object-side surface of the first lens element is R1, a radius of curvature of the image-side surface of the first lens element is R2, and they satisfy the relation: $1.03<(R1+R2)/(R1-R2)<3.00$.

15. The wide-angle imaging lens assembly according to claim 14, wherein a radius of curvature of an image-side surface of the fourth lens element is R8, a radius of curvature of an object-side surface of the fourth lens element is R7, and they satisfy the relation: $-1.40<R8/R7<0.70$.

16. The wide-angle imaging lens assembly according to claim 14, wherein the object-side and image-side surfaces of the fourth lens element are both concave.

17. A wide-angle imaging lens assembly comprising, in order from an object-side to an image-side:
   a first lens element with negative refractive power having a concave image-side surface;
   a second lens element with negative refractive power having a convex object-side surface and a concave image-side surface;
   a third lens element with positive refractive power;
   a fourth lens element with negative refractive power having a concave image-side surface; and
   a fifth lens element with positive refractive power; wherein the number of lens elements with refractive power is five; wherein the wide-angle imaging lens assembly is further provided with an electronic sensor for image formation of an object; and wherein a thickness of the fourth lens element on an optical axis is CT4, a radius of curvature of the image-side surface of the fourth lens element is R8, a focal length of the wide-angle imaging lens assembly is f, half of a diagonal length of an effective pixel area of the electronic sensor is ImgH, a focal length of the first lens element is f1, a focal length of the second lens element is f2, and they satisfy the relations: $0<CT4/R8<0.70$, $0.04<f/ImgH<1.10$, $0<f1/f2<1.20$.

18. The wide-angle imaging lens assembly according to claim 17, wherein a radius of curvature of the object-side surface of the first lens element is R1, a radius of curvature of the image-side surface of the first lens element is R2, and they satisfy the relation: $1.03<(R1+R2)/(R1-R2)<3.00$.

19. The wide-angle imaging lens assembly according to claim 17, wherein the fourth lens element has a concave object-side surface.

* * * * *

UNITED STATES PATENT AND TRADEMARK OFFICE
CERTIFICATE OF CORRECTION

| | |
|---|---|
| PATENT NO. | : 8,654,458 B2 |
| APPLICATION NO. | : 12/978996 |
| DATED | : February 18, 2014 |
| INVENTOR(S) | : Tsung Han Tsai |

It is certified that error appears in the above-identified patent and that said Letters Patent is hereby corrected as shown below:

In the Claims

Column 24, Claim 17, Line 47, the right-hand formula should appear as follows:

$0 < CT4/R8 < 0.70, 0.40 < f/ImgH < 1.10, 0 < f1/f2 < 1.20.$

Signed and Sealed this
Thirtieth Day of December, 2014

Michelle K. Lee
*Deputy Director of the United States Patent and Trademark Office*